(12) United States Patent
Devaraj et al.

(10) Patent No.: US 10,186,267 B1
(45) Date of Patent: Jan. 22, 2019

(54) MESSAGE PLAYBACK USING A SHARED DEVICE

(71) Applicant: Amazon Technologies, Inc., Seattle, WA (US)

(72) Inventors: Christo Frank Devaraj, Seattle, WA (US); Brian Oliver, Seattle, WA (US); Sumedha Arvind Kshirsagar, Seattle, WA (US); Gregory Michael Hart, Mercer Island, WA (US); Ran Mokady, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/392,844

(22) Filed: Dec. 28, 2016

(51) Int. Cl.
| | |
|---|---|
| G10L 15/00 | (2013.01) |
| G10L 15/22 | (2006.01) |
| H04L 29/08 | (2006.01) |
| H04L 12/58 | (2006.01) |
| G10L 15/18 | (2013.01) |
| G10L 17/02 | (2013.01) |
| G10L 17/22 | (2013.01) |
| G10L 13/08 | (2013.01) |

(Continued)

(52) U.S. Cl.
CPC .......... G10L 15/22 (2013.01); G06F 17/3056 (2013.01); G10L 13/08 (2013.01); G10L 15/1815 (2013.01); G10L 17/02 (2013.01); G10L 17/22 (2013.01); H04L 51/26 (2013.01); H04L 67/1044 (2013.01); H04L 67/303 (2013.01); H04L 67/306 (2013.01); G10L 2015/088 (2013.01); G10L 2015/223 (2013.01)

(58) Field of Classification Search
CPC .......... H04W 4/12; H04M 3/533; G10L 15/26
USPC ........................................... 379/88.04
See application file for complete search history.

(56) References Cited

U.S. PATENT DOCUMENTS

| | | | |
|---|---|---|---|
| 4,581,486 A * | 4/1986 | Matthews ............. | H04M 3/533 379/69 |
| 6,570,964 B1 | 5/2003 | Murveit et al. | |
| 6,857,074 B2 | 2/2005 | Bobo, II | |

(Continued)

OTHER PUBLICATIONS

Non-Final Office Action dated Oct. 12, 2017, U.S. Appl. No. 15/392,827, 11 pages.

(Continued)

*Primary Examiner* — Daniel Abebe
(74) *Attorney, Agent, or Firm* — Pierce Atwood LLP

(57) ABSTRACT

Methods and systems for prioritizing messages for playback are described herein. In some embodiments, a request for messages to be output may be received by a speech-processing system. The speech-processing system may include a message database that includes messages received for a speaker of the request's user account and/or a group account associated with a shared electronic device that the request was received from. One or more prioritization rules may be applied to the messages to order the messages for playback in order to provide an optimal voice user interface for the requesting individual. For instance, messages received for the user account may be prioritized over messages received for the group account, messages received from a similar sender or a high priority sender may be prioritized over other messages, and messages that are indicating as being urgent may be prioritized over messages that are indicated as being non-urgent.

20 Claims, 9 Drawing Sheets

(51) Int. Cl.
 *G06F 17/30* (2006.01)
 *G10L 15/08* (2006.01)

(56) References Cited

U.S. PATENT DOCUMENTS

| | | | | |
|---|---|---|---|---|
| 7,197,461 | B1 * | 3/2007 | Eberle | G10L 15/26 379/88.04 |
| 7,436,939 | B1 | 10/2008 | Packingham et al. | |
| 2004/0165702 | A1 | 8/2004 | Finnigan | |
| 2010/0054433 | A1 | 3/2010 | Gustave et al. | |
| 2014/0082524 | A1 | 3/2014 | Vendrow et al. | |
| 2015/0148084 | A1 | 5/2015 | Arkko et al. | |
| 2016/0381527 | A1 * | 12/2016 | Jee | H04W 4/10 455/518 |
| 2017/0245125 | A1 * | 8/2017 | Child | H04W 4/12 |

OTHER PUBLICATIONS

Non-Final Office Action dated Sep. 26, 2017, U.S. Appl. No. 15/392,810, 11 pages.
Devaraj et al., Pending U.S. Appl. No. 15/392,810 entitled "Message Playback Using a Shared Device", filed Dec. 28, 2016.
Devaraj et al., Pending U.S. Appl. No. 15/392,827 entitled "Message Playback Using a Shared Device", filed Dec. 28, 2016.

* cited by examiner

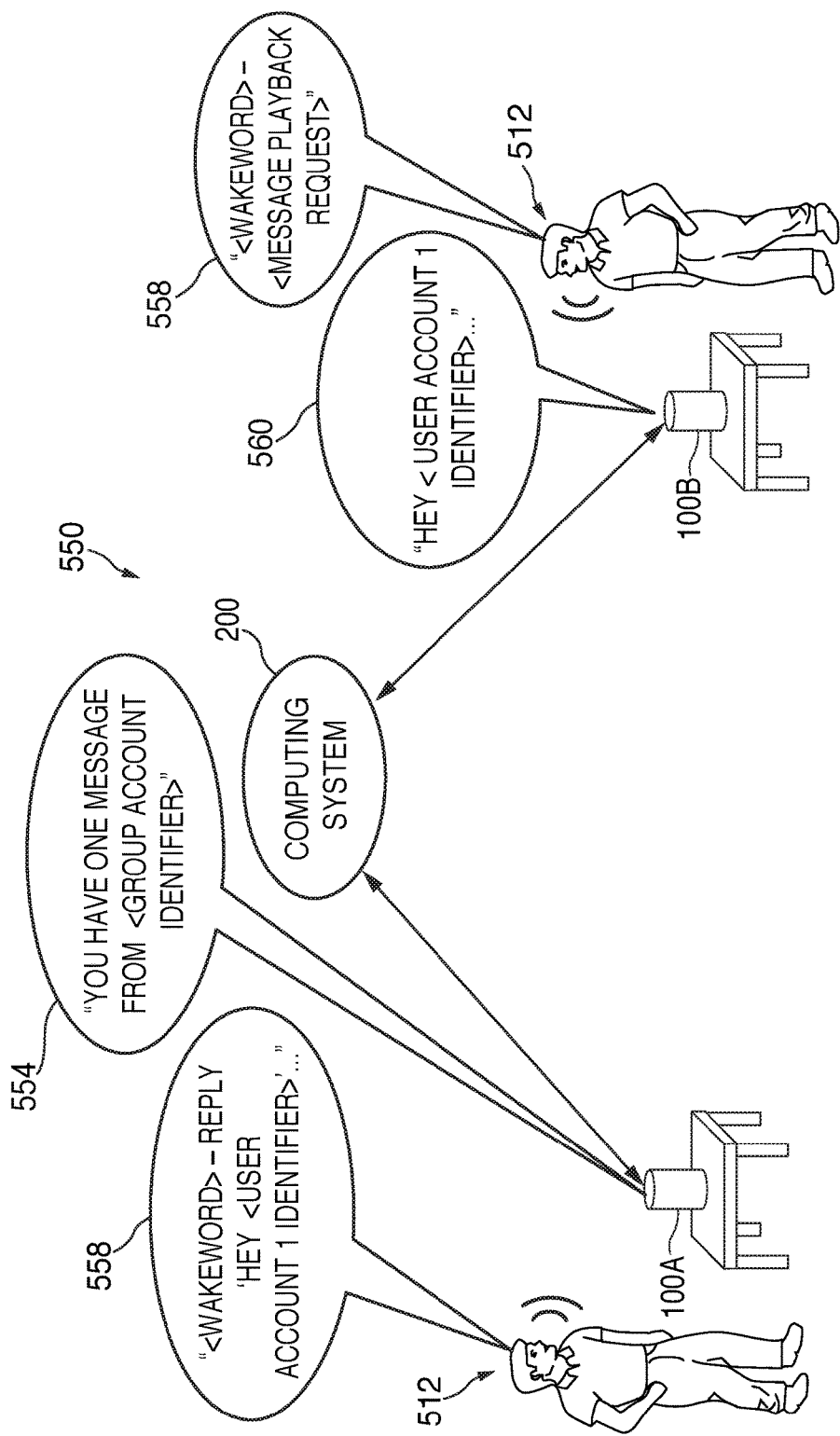

MESSAGE PLAYBACK USING A SHARED DEVICE

BACKGROUND

Messaging services, such as text messaging, email messaging, and phone messaging, are prominent in most messaging systems, and allow individuals to consume messages in a number of ways. Typically, visual display of such messages allow users to pick and choose which messages they want to consume. Technical solutions are described herein for providing messages to users using voice controlled devices.

BRIEF DESCRIPTION OF THE DRAWINGS

FIG. 5B is an illustrative diagram of another exemplary system for redirecting a reply message from being directed to a first recipient to being directed to a second recipient, in accordance with various embodiments;

DETAILED DESCRIPTION

Figure 1:
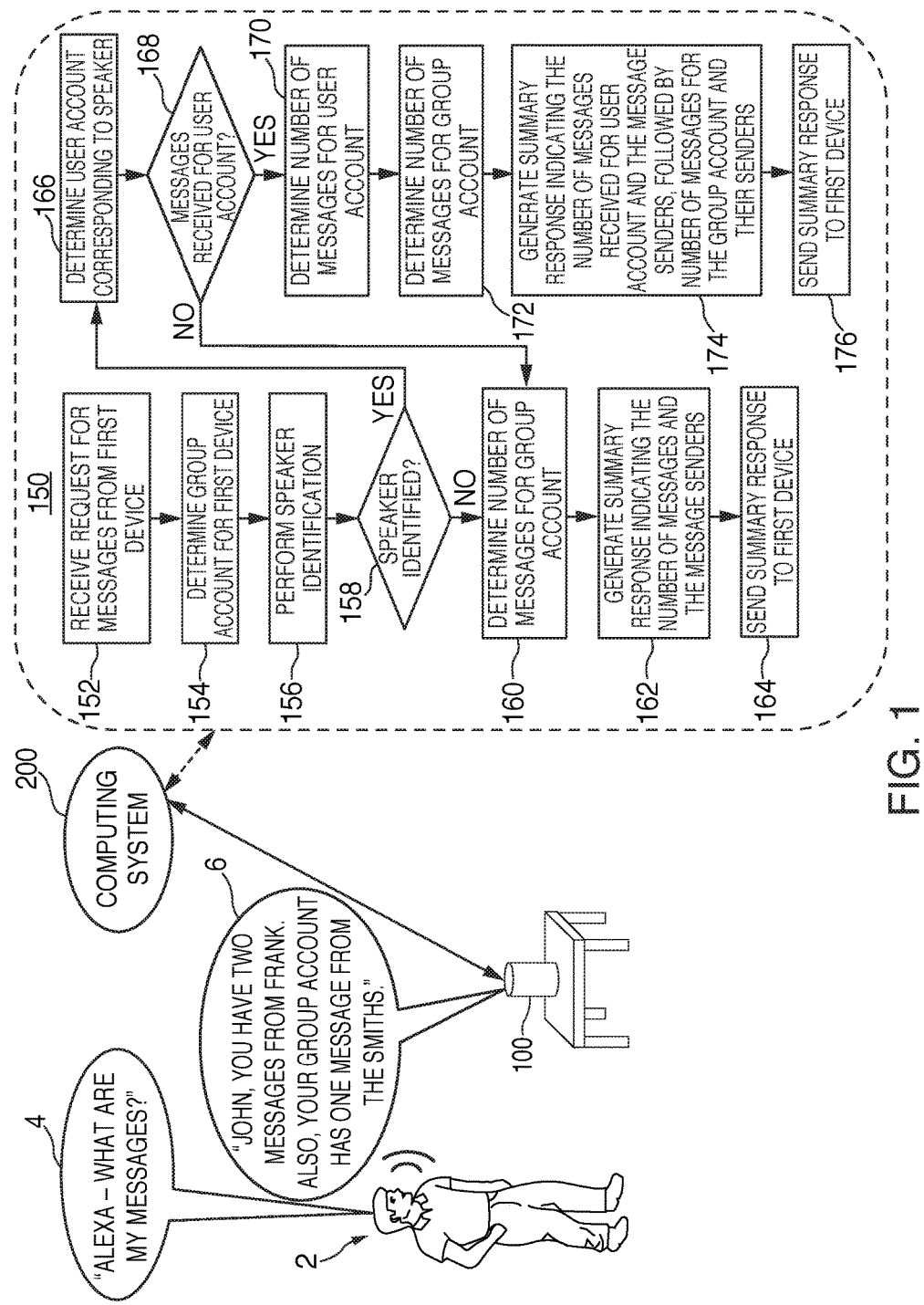
FIG. 1 is an illustrative diagram of an exemplary system for obtaining messages from a voice activated electronic device using speaker identification techniques, in accordance with various embodiments.

The present disclosure, as set forth below, is generally directed to various embodiments of methods, devices, and systems for playing messages for a user account and/or a group account using a voice activated electronic device. Generally speaking, voice activated electronic devices are primarily interacted with using speech. Therefore organizing messages in a logical manner for consumption by a user, and creating a natural voice interface for the user, is paramount to provide an optimal user experience.

In a non-limiting embodiment, messaging playback rules may be provided for determining how messages are to be grouped when played back using an electronic device. For instance, grouping/organizing messages for playback on a headless (e.g., not including a display screen) device is non-trivial because the user is not able to select which messages he/she would like to hear first. Additionally or alternatively, the embodiments described herein can be applied to any voice-forward user interface, including those implemented by devices with display screens (such as, e.g., tablets, automobiles, cellular phones, laptop computers, etc.). When an individual utters a request to have their messages played, the electronic device may first attempt to determine who is speaking in order to properly determine which, if any, messages should be provided to the individual ahead of others. This task may be further complicated by the nature of some devices in that these device are often used by multiple individuals. Therefore, a determination may be needed as to which messages should be provided to and prioritized for which individuals. On top of this, such devices may, themselves, may function as their own "entity," capable of sending and receiving messages to/from other user accounts and/or other group accounts.

As an illustrative example, a first family may have a first voice activated electronic device, and a second family may have a second voice activated electronic device. A first individual of the first family may send a message to the second family using the first voice activated electronic device. The first individual may also be able to send a message to a second individual of the second family using the second voice activated electronic device. In these particular scenarios, the second voice activated electronic device may need to determine, in response to an individual requesting to hear messages, whether that particular individual (e.g., the second individual) has received any messages, as well as whether any messages have been received for the second family.

In some embodiments, message playback may be configured such that messages received for an individual's user account are output prior to messages received for a corresponding group account. This may allow an individual to receive their messages first, prior to receiving messages directed to the group account. To do this, for instance, speaker identification may be employed to determine a speaker of a request to playback messages. If the speaker identification processing is able to identify the speaker, then messages received for that speaker's user account may be obtained. After the speaker's messages are accounted for, messages for the group account associated with the shared electronic device may be obtained.

In some embodiments, one or more temporal rules and/or grouping rules, may be employed to provide individuals with a more natural and fluid experience when obtaining messages using their voice interface instead of using a predefined and standard template. For example, in response to requesting messages that have been received, a generic message may be generated and played, such as "Message 1, received at <Timestamp>, from <Sender Identifier>." After this generic message is played, the message would follow. If more than one message was received, then a similar generic output message (e.g., "Message 2, received at <Timestamp>, from <Sender Identifier>") could be generated and played, followed by a next message. If an individual seeks to perform an action (e.g., skip a message, delete a message, etc.), they may press a button, or touch a user interface displayed on a device to cause a corresponding action to occur. Furthermore, if a graphical user interface including the messages were capable of being displayed on a display screen, an individual would have the option to pick and choose which messages to listen to first, second, etc., or even not listen to at all, amongst various available options.

With a voice activated electronic device, for example, where primary (or only) functionality may be via spoken words, many of the aforementioned options may not be available, or may detract from the user's experience. For instance, if employing the aforementioned generic message techniques, one would have to simply wait and listen to each message that has been received. To provide users for a more natural voice user interface, messages may be grouped together by similar recipient. In one embodiment, messages received from the same sender may be grouped together such that an individual associated with a particular user account may be informed of the fact that multiple messages from the same sender have been received. As an illustrative example, if an individual's user account may receive five messages from one particular messaging account, then a response may be generated and output indicating the messaging information (e.g., "Your mother called five times" or "You have five messages from 'Mom'"). Additionally, colloquial temporal rules may be employed to enhance the voice user interface so that an individual, when listening to the messages, may not be subjected to one or more standardized message summarization rules (e.g., "Message 1, received at <Timestamp>, from <Sender Information>"). In one embodiment, if a request to play messages is received within a certain amount of time of a particular message or within a certain period of time (e.g., within the last five minutes, between 2:00 and 2:59) then that message may be indicated as having been received within that amount of time (e.g., "You received a message within the last five minutes") or time period (e.g., "You received only one message between 2 and 3"). As another example, if a same sender's messaging account has sent multiple messages within a predefined threshold amount of time, then those messages may be grouped together and one or more temporal messaging rules may be applied. For example, if an individual received five messages from their mother's user account within the last hour, then a summary response of that individual's messages may indicate (e.g., "Your mother called five times within the last hour").

In some embodiments, messages may be prioritized for playback using one or more prioritization rules. For instance, messages received for a user account may be configured to be output prior to messages received for a group account. As an illustrative example, if an individual speaks an utterance to a shared voice activated electronic device, "Alexa, Play my messages," then the shared voice activated electronic device may, in response to determining that a wakeword triggering the device has been uttered, begin sending audio data representing the utterance to a speech-processing system. The speech-processing system may determine a group account assigned to the voice activated electronic device based, for example, on a device identifier associated with the voice activated electronic device. After receiving the audio data, the speech-processing system may perform speaker identification processing to determine a speaker of the utterance. If the speaker identifier is capable of being determined, then the speech-processing system may determine a corresponding user account that the particular speaker identifier is associated with. The speech-processing system may access, in one embodiment, a message database and may determine messages received for the group account and the identified user account. The messages may then be organized such that the messages received for the user account of the speaker are output first, followed by the messages received for the group account. For instance, a summary response indicating the number of messages that have been received for the user account and the group account may be generated and sent to the voice activated electronic device, "You received three messages, and the household received two messages." Persons of ordinary skill in the art will recognize that one or more of the aforementioned processes may occur on a communications system as opposed to, or in addition to, the speech-processing system. For example, the speech-processing system may provide a device's identifier to the communications system, which may determine a group account, and any messages that have been received by the group account, associated with the device.

In addition to prioritizing messages based on a speaker identifier (e.g., messages received for a speaker's user account may be output prior to messages received for a group account), in one embodiment, additional prioritization rules may be employed. For example, certain sender messaging accounts may be indicated as being high priority senders, and therefore their messages may be output prior to messages received from lower priority senders. As an illustrative example, an individual may select a particular sender's messaging account to be a high priority account. If that sender's messaging account sends a message to the individual's group account and/or user account, then that message may, in response to a request to output messages being received, be caused to be output prior to messages received from non-high priority account. Various other prioritization rules may include, but are not limited to, temporal rules, content rules, sender messaging account rules (e.g., a same sender, a flagged sender, a high-priority sender), rules associated with an inflection in a tone associated with an utterance, historical rules, and/or any other rule, and/or any combination thereof. Temporal rules, for instance, may include such rules as causing recently received messages to be output prior to messages received less recently. Similar sender rules, for instance, may include an ability to collect messages received from a same sender's user/group account together such that those messages may be output together. Content rules, in one embodiment, may allow certain messages to be analyzed to determine whether a content of that particular message includes information indicating that that message is particularly important, and therefore should be output prior to messages that are determined to be not important. For example, if a message includes the word "urgent" (e.g., spoken words, text, etc.), then that message may be determined to be of higher priority than other messages that have been received, and therefore the "urgent" message may be output first. Rules associated with an inflection in a tone associated with an utterance may correspond determining, based on acoustic features associated with an utterance, that a particular message is more "urgent" or "important" than another message (or messages). Historical rules may correspond to determining various features associated with a request or communication based on previous interactions with the receiving device (e.g., determine a user account based on a likelihood that a speaker is a particular individual based on the various interactions previously detected by a device).

In some embodiments, one or more message redirection rules may be employed that allow messages initially intended on being sent to a first recipient to, instead, be sent to a second recipient based, for instance, on contextual information of the message. As an illustrative example, an individual may say, "Alexa, send a message to the Smith household: 'Hey John. Want to come over?'." In this particular scenario, the message may initially be intended to be sent to a group account (e.g., the Smith household). However, the actual message (e.g., "Hey John. Want to come over?") may be for particular user account of the group account (e.g., "John"). Therefore, the message may, instead of being sent to the group account (e.g., the Smith household) may be sent to the user account of the identified recipient from the message (e.g., a user account for "John"). As another example, an individual may send a message to a group account. The message may be sent from the individual's group account, even though the individual was the one that uttered the message. When another individual receives the message from the group account, this individual may respond to the message, which the response may—because the message was sent from the individual's group account—be initially directed to the individual's group account. However, because the individual's user account, and not the individual's group account, may be the intended recipient, and therefore a communications system may cause the response to be redirected to the individual's user account.

In some embodiments, to redirect messages, a speech-processing system may receive audio data representing an utterance including a wakeword portion, a command portion (e.g., "send a message that says"), a recipient portion ("to the Smiths"), and a message payload ("looking forward to seeing you later"). Upon receipt, the speech-processing system may generate text data representing the audio data by performing speech-to-text processing to the audio data. After the text data is generated, the speech-processing system may perform natural language understanding processing to the text data to determine an intent of the utterance. For instance, the speech-processing system may determine that the text data has a format matching a sample utterance framework, "<Wakeword>, Send a message to <Group Account Identifier>: <Message Payload>." In this particular example, the values for <Wakeword>, <Group Account Identifier>, and <Message> may be, Alexa, the Smith household, and "Hey John. Want to come over?", respectively. In one embodiment, natural language processing associated with the speech-processing system may determine, based on the message play load, that the message is directed to a different messaging account than a messaging account resolved from the recipient portion. The speech processing system may then provide the text data and/or different messaging account to a contextual analysis system associated with a communications system to determine a particular user account (or group account) associated with the different messaging account. The message may then be redirected to the particular user account instead of the messaging account identified from the recipient portion.

In some embodiments, a shared device, such as the shared devices described above, may correspond to sound controlled electronic device. Sound controlled electronic devices may be used by any number of individuals. For example, a family may have a sound controlled electronic device in their household that two or more members of the family may use. In this context, the sound controlled electronic device may be a "shared device" in that multiple individuals may use the sound controlled electronic device. Each individual may have their own user account associated with that sound controlled electronic device, and, in addition, the sound controlled electronic device may itself have a group account assigned to it. The group account may be capable of being accessed by multiple individuals, while a user account may correspond to one particular individual.

One type of sound controlled electronic device may be a voice activated electronic device. In particular, a voice activated electronic device may correspond to one type of sound controlled electronic device that is capable of being activated in response to a wakeword being uttered. In response to determining that a wakeword has been uttered, the voice activated electronic device may, in some embodiments, send the audio data representing a spoken utterance subsequently following the wakeword to a speech-processing system for processing and analyzing the audio data. The speech-processing system may then generate and send a response to the voice activated electronic device, as well as, or alternatively, communicate with one or more additional systems for obtaining content to be rendered by the voice activated electronic device, and/or may cause one or more additional electronic devices to output content and/or perform a particular action (e.g., turn on a light, preheat an oven, etc.). Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow the detected wakeword as actionable inputs or commands. In some embodiments, the voice activated electronic device may be activated by a phrase or grouping of words, which the voice activated device may also be configured to detect. The voice activated device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music." Further still, an utterance, which need not include the wakeword, may be, "Turn up the volume" or "Call mom."

Another type of sound controlled electronic device may be a sound activated electronic device. Such sound activated electronic device may function similarly to voice activated electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the sound controlled electronic device may also correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice activated electronic device and/or a sound activated electronic device) may include manual activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1 is an illustrative diagram of an exemplary system for obtaining messages from a voice activated electronic device using speaker identification techniques, in accordance with various embodiments. In the non-limiting example embodiment, an individual 2 may speak an utterance 4 to their shared voice activated electronic device 100. Utterance 4, for instance, may correspond to a request for messages to be played by shared voice activated electronic device 100. For example, utterance 4 may be, "Alexa—What are my messages." Other similar types of messages may include, but are not limited to, "Alexa—Play my messages," "Alexa—Do I have any messages?", and the like. In this particular example, "Alexa" may correspond to a wakeword for voice activated electronic device 100 that causes voice activated electronic device 100 to begin sending audio data representing utterance 4 to a speech-processing system 200, and "What are my messages" may correspond to an invocation requesting that messages that have been received for a user account of individual 2 and/or a group account for voice activated electronic device 100.

Upon receipt by computing system 200, text data representing the audio data may be generated using speech-to-text processing performed to the audio data. Natural language understanding processing may then be performed to the text data to determine an intent of utterance 4. For instance, the intent of the invocation "What are my messages?" may be a request for messages that have been received for a user account and/or a group account to be output by voice activated electronic device 100. However, this particular invocation, for example, may include the term "my," and therefore speech-processing system 200 may attempt to determine whether messages are to be output for a particular user account, such as a user account of individual 2, and/or for a group account, such as a group account associated with voice activated electronic device 100. In the former's case, a determination of which user account, if any, is the appropriate user account with which to obtain messages from, may occur so that messages related to individual 2 are output as opposed to messages received for another member of the group account of voice activated electronic device 100.

In some embodiments, shared voice activated electronic device 100 may have a group account associated therewith, where the group account may be unique to shared voice activated electronic device 100. Each group account may include one or more user accounts also associated with it, where each user account may be associated with a particular individual, and may be capable of accessing communications received by the group account. Furthermore, messages received for the group account may also be received by each user account associated with the group account. For example, a family's voice activated electronic device may have a group account associated with it, and each family member may have their own user account. In some embodiments, a particular group account may have one or more group accounts also associated with it. For example, a particular family may have two or more shared voice activated electronic devices, each associated with a single group account, or each having their own group account that are related to one another as being part of a same "group."

In some embodiments, speaker identification processing may be performed to the audio data representing utterance 4 to determine, or attempt to determine, a speaker of utterance 4. Speaker identification processing, which is described in greater detail below with reference to FIG. 2, may generate acoustic features associated with the audio data, may generate a vector representing the acoustic features, and may determine a confidence score indicating a likelihood that the vector substantially matches one or more stored vectors associated with one or more user accounts. If the confidence score is greater than predefined confidence score threshold, for example, then the user account associated with the particular stored vector resulting in the match may be determined, indicating that a user associated with that user account is likely the speaker of the utterance. For example, speaker identification processing may be performed to audio data representing utterance 4, and a speaker identifier may be determined to substantially match voice biometric data associated for a user account of individual 2, indicating that individual 2 is the likely speaker of utterance 4.

In some embodiments, in response to determining that a request for message playback has been received, messages received for a particular user account and/or group account that has/have been identified may be obtained from a message database. For example, the message database may store any messages that have been received for a particular group account and/or user account. Speaker identification processing associated with computing system 200 may determine the user account and/or group account with which the message playback request is associated with, and then may determine, amongst other information, a number of messages that have been received, as well as sender information associated with each received message. As an illustrative example, computing system 200 may determine a number of messages that have been received for a user account associated with individual 2 based on identifying a speaker identifier of individual 2, and may also determine a number of messages that have been received for a group account associated with shared voice activated electronic device 100. After determining the number of messages that have been received, the sender information for those messages may be determined, and text data representing a summary response may be determined that indicates to the requesting individual (e.g., individual 2), the message playback information. Audio data representing the text data may be generated, and the audio data may be sent to voice activated electronic device 100. For instance, in the illustrative embodiment, computing system 200 may generate audio data representing a summary response 6, "John, you have two messages from Frank. Also, your group account has one message from the Smiths." In this particular example, computing system 200 may have identified that the user account of individual 2 corresponds to a user account identifier, "John," and that this individual's user account received two messages from a contact having an identifier, "Frank." Furthermore, computing system 200 may determine that a group account for shared voice activated electronic device 100 received one message from a contact having an identifier, "the Smiths." In the illustrative embodiment, summary response 6 may be selected such that the messages from the user account are provided to the requesting individual prior to messages received for the group account, however persons of ordinary skill in the art will recognize that this is merely exemplary.

In a non-limiting embodiment, computing system 200 may perform process 150. Process 150 may begin at step 152. At step 152, a request for messages may be received from a first device. For instance, a speech-processing system of computing system 200 may receive audio data representing an utterance, such as utterance 4—"Alexa—Play my messages." In response to receiving the audio data, the speech-processing system may generate text data representing the audio data by performing speech-to-text processing to the audio data. Using the text data, a determination as to the intent of the utterance may occur using natural language understanding processing associated with computing system 200. For instance, the intent of utterance 4, "Alexa—Play my messages," may be for messages to be output by the requesting device (e.g., voice activated electronic device 100). In one embodiment, utterance 4 may be determined to have a format substantially matching one or more sample utterances corresponding to message playback requests. Such sample utterances may include, but are not limited to, "Play my messages," "What are the messages?", "What are my messages?", "What are the messages?", "What's the message?", "read/play all messages," "What are messages for <Recipient Name>?", and "What are messages from <Contact Name>?" Each of these sample utterances may have a similar intent, and therefore cause computing system 200 to provide the text data resolved into slots and values to a communications system associated with computing system 200. The communications system may, in some embodiments, determine a user account and/or a group account associated with a speaker of utterance 4—if able to be identified using speaker identification processing—and may obtain information associated with messages that have been received for the user account and/or the group account.

At step 154, a group account associated with the first device may be determined. In addition to receiving the request, a computing system associated with computing system 200 may also receive a device identifier for the first device. For example, shared voice activated electronic device 100 may send a media access control ("MAC") address, serial number, IP address, and/or any suitable identifier, with audio data representing utterance 4. Using the device identifier, a corresponding group account associated with the requesting device's identifier may be determined. As an illustrative example, shared voice activated electronic device 100 may, in addition audio data representing utterance 4, send a device identifier to computing system 200. Using the device identifier, computing system 200 may determine that shared voice activated electronic device 100 is associated with a first group account. In some embodiments, computing system 200 may include a communications table including a listing of device identifiers and the corresponding group accounts (as well as user accounts) associated therewith. In this way, anytime a communication is received from a device by computing system 200, a corresponding messaging account may be determined, and the requesting device may be identified.

At step 156, speaker identification processing may be performed to the audio data representing the utterance corresponding to the request. In some embodiments, speaker identification processing may include generating acoustic features associated the audio data. For example, a frequency spectrum over time corresponding to the audio data may be generated by computing system 200. A vector representing the acoustic features may be generated, and the vector may be compared to one or more stored vectors associated with one or more user accounts that the group account is associated with. A confidence score may be determined, where the confidence score indicates a likelihood that the generated vector and a stored vector are equivalent, indicating that a speaker of an utterance corresponds to a user of a user account associated with that stored vector.

At step 158, a determination may be made as to whether the speaker has been identified. For example, if the confidence score is determined to be greater than a predefined confidence score threshold, then this may indicate that a speaker of the utterance is likely the user associated with a particular user account. As an illustrative example, the group account associated with shared voice activated electronic device 100 may be associated with one or more user accounts, where each user account includes voice biometric information (e.g., a vector representing acoustic features associated with a particular individual's voice). The speaker identification processing may, therefore, determine whether a confidence score indicating a likelihood that the generated speaker identifier (e.g., vector) is substantially equivalent to a stored speaker identifier associated with a user account is greater than a predefined confidence score threshold. If so, then the speaker may be said to be identified. If not, then the speaker may not have been identified.

If, at step 158, the speaker has not been able to be identified (e.g., the confidence score is less than or equal to a predefined confidence score threshold), then process 150 may proceed to step 160. At step 160, a number of messages that have been received for the group account may be determined. As the speaker was not identified, the intent of the request for messages (e.g., utterance 4, "what are my messages") may correspond to obtaining messages for the group account of the requesting device (e.g., voice activated electronic device 100). A message database of the communications system of computing system 200 may store messages that have been received for various messaging accounts (e.g., group accounts and user account). Therefore, in response to determining that the request for messages corresponds to a request for messages associated with a particular group account, the message database may determine a number of messages received for that group account as well as, in some embodiments, sender information associated with each message. For example, message database may currently have one new message that has been received for the group account associated with voice activated electronic device 100, and may also store message metadata indicating sender information corresponding to that message. For instance, one message may have been received for a group account from a messaging account corresponding to a first sender. In some embodiments, additional message information may also be stored by the message database for each message that has been received including, but not limited to, a timestamp indicating a time that a particular message was received, a device type of the sending device, additional group and/or user accounts that were also sent the message, a geographical position of the device that the message was sent from, and/or any other message information, or any combination thereof.

At step 162, a summary response may be generated indicating the number of messages that have been received for the group account, as well as sender information of each message. In some embodiments, text data representing the summary response may be determined, and audio data representing the text data may be generated using text-to-speech processing. Additional messaging information, such as that described above, may also be included within the summary response, however the aforementioned is merely illustrative. For example, text data representing an exemplary summary response may be, "<Group Account Identifier> received <Number of Messages Received>." As another example, text data representing an exemplary summary response may be, "<Number of Messages Received from <Sender 1>> received from <Sender 1 Identifier>." Using the text data representing the appropriate sample summary response framework, the corresponding values may be filled in, and audio data representing the text data may be generated. At step 164, the audio data representing may be sent to the first device. As an illustrative example, if speaker identification processing was unable to identify individual 2 as a speaker of utterance 4, then messages for the group account associated with shared voice activated electronic device 100 may be determined, and audio data corresponding to a summary response of these messages—"Your group account has one message"—may be generated and sent to voice activated electronic device 100.

If, however, at step 158, the speaker was able to be identified (e.g., the confidence score is greater than the predefined confidence score threshold), then process 150 may proceed to step 166. At step 166, a user account of the speaker may be determined. In some embodiments, voice biometric information (e.g., stored vectors representing acoustic features associated with one or more user accounts of the identified group account) may be compared with the generated vector representing acoustic features associated with audio data representing utterance 4.

After determining a speaker of the request corresponding to a particular user account, process 150 may proceed to step 168 where a determination may be made as to whether or not any messages have been received for the user account. If, at step 168, it is determined that no messages have been received for the user account, then process 150 may proceed to step 160, where a determination as to a number of messages received for the group account may occur, and a summary response may be generated and sent to the first device. For instance, the summary response may, in this particular scenario, correspond to, "<Speaker Identifier>, you do not have any messages. <Group Account Identifier> has <Number of Messages for Group Account>."

However, if at step 168 it is determined that messages have been received for the user account, then process 150 may proceed to step 170. At step 170, a number of messages that have been received for the user account may be determined. The message database may store messages received for various user accounts and group accounts, and therefore computing system 200, and in particular a communications system associated with computing system 200, may access the message database to determine the number of messages that were received for the user account associated with the identified speaker. As an illustrative example, the message database may indicate that two messages have been received for the user account associated with individual 2. At step 172, a determination as to a number of messages that have been received for the group account associated with the first device may be determined. For example, the message database may indicate that one message has been received for the group account associated with voice activated electronic device 100. In some embodiments, step 172 may be substantially similar to step 160, and the previous description may apply.

At step 174, text data representing a summary response indicating the number of messages received for the user account and the senders of those messages, as well as the number of messages received for the group account and those messages senders, may be generated. In one embodiment, the text data representing the summary response may be determined by selecting a sample summary response, and then filling in the appropriate information into that sample summary response. For example, a sample summary response for indicating messages received for both a user account and a group account, including sender information for those messages, may be "<Speaker Identifier>, you have <Number of Messages Received For User Account> from <Sender Information for User Account Messages>. Also, your group account has <Number of Messages Received for Group Account> from <Sender Information for Group Account Messages>." Therefore, in this particular example, if two messages were received by the user account from a same sender's messaging account (e.g., "Frank"), and one message was received for the group account from a different sender (e.g., the "Smiths"), then text data representing summary response 6 may be generated, and audio data representing the text data may be generated. At step 176, the audio data may be sent to the first device. For example, audio data representing summary response 6, "John, you have two messages from Frank. Also your group account has one message from the Smiths," may be sent to shared voice activated electronic device 100, and output such that individual 2 may be notified of the messages that a user account of individual 2 has received and/or a group account that the user account is associated with has received.

Figure 2:
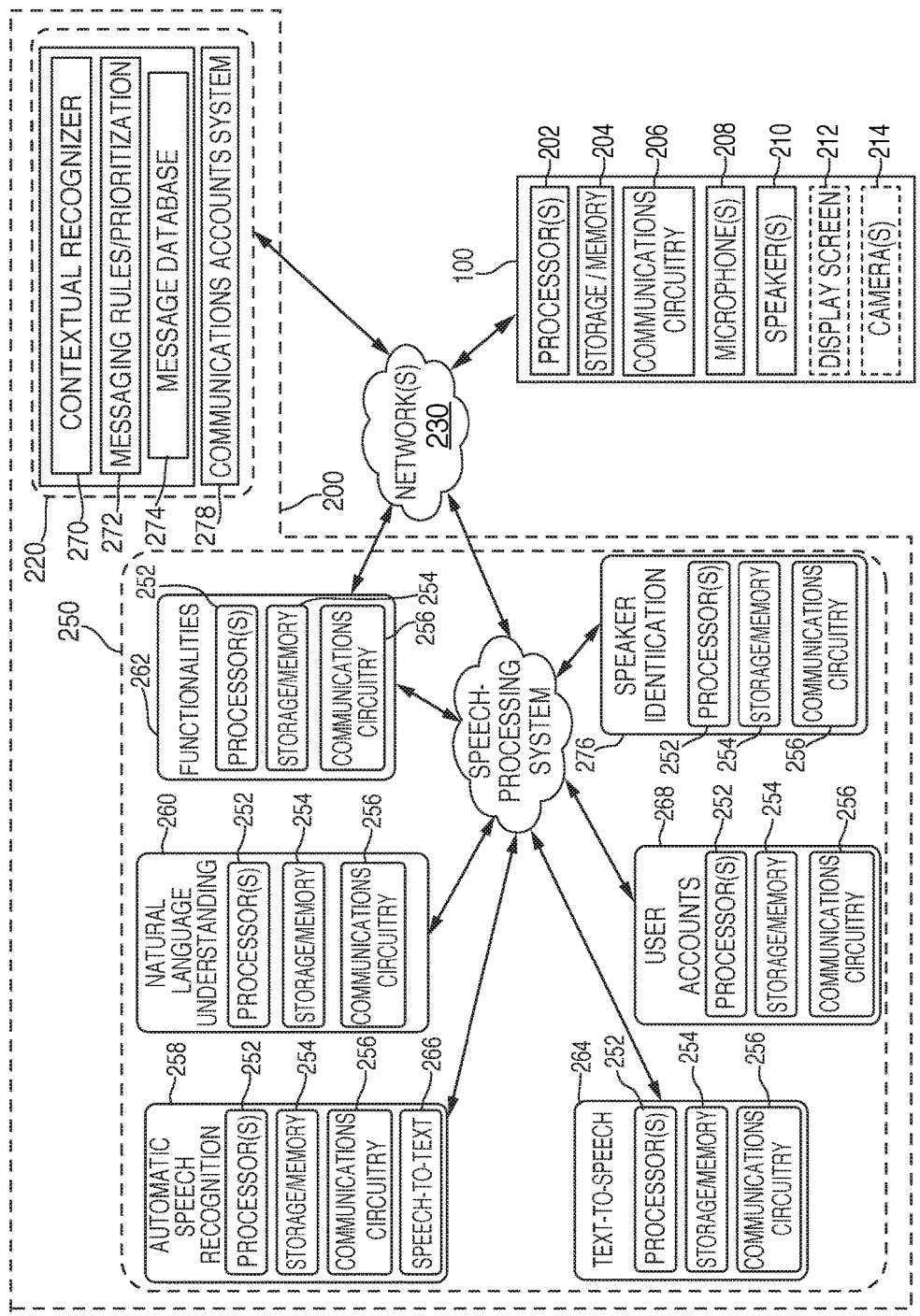
FIG. 2 is an illustrative diagram of the exemplary system architecture of FIG. 1, in accordance with various embodiments.

FIG. 2 is an illustrative diagram of the exemplary system architecture of FIG. 1, in accordance with various embodiments. Shared electronic device 100 may, in some embodiments, include sound controlled functionality, such as one or more voice or sound activated components. In some embodiments, electronic device 100 may be configured to communicate with computing system 200 in response to detecting an utterance including a wakeword, which may subsequently be followed by a request/question/statement. Similarly, electronic device 100 may alternatively or additionally include one or more manually activated components for manually activating electronic device 100. In this particular scenario, electronic device 100 may also be configured, in one embodiment, to communicate with computing system 200 in response to a manual input being detected by one or more input mechanisms, such as a touch screen, a button, and/or a switch, for example.

In a non-limiting embodiment, electronic device 100 may be capable of being activated in response to detecting a specific sound, such as a wakeword, as well as, or alternatively, via one or more inputs. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100.

Electronic device 100 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in one embodiment, may include a minimal number of input mechanisms (e.g., a power on/off switch) such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with computing system 200, send audio data to computing system 200, and await/receive a response from computing system 200. In some embodiments, however, non-voice/sound activated devices may also communicate with computing system 200. For example, in response to a button or touch screen being pressed, or a button or touch screen being pressed and held, a microphone associated with electronic device 100 may begin recording local audio, establish a connection with computing system 200, send audio data representing the captured audio to computing system 200, and await/receive a response, and/or action to be occur, from computing system 200.

Persons of ordinary skill in the art will recognize that computing system 200 may be located within a dedicated computing device or computing system, which may or may not be in communication with one or more additional devices. For instance, computing system 200 may be located on a remote computing system with which an individual subscribes to a service on. However, computing system 200 may also be included within a computing system locally stored or owned by an individual.

Electronic device 100 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, electronic device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100 may include one or more microphone(s) 208. These microphone(s) 208 may receive audio input signals, and electronic device may determine whether or not the audio input signals indicate that a wakeword was uttered. If so, then electronic device may cause audio data representing an utterance including the wakeword, or spoken after the wakeword to be sent to computing system 200.

Processor(s) 202 may include any suitable processing circuitry capable of controlling operations and functionality of electronic device 100, as well as facilitating communications between various components within electronic device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100.

Storage/memory 204 may include one or more types of storage mediums such as any volatile or non-volatile memory, or any removable or non-removable memory implemented in any suitable manner to store data for electronic device 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EE-PROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic devices 100 and computing system 200, and in particular, communications system 220. For example, the media system may store one or more communications protocols that may be executed by processor(s) 202 for facilitating communications for device 100. In some embodiments, a sessions initiation protocol ("SIP") may be used to facilitate media transfer between electronic device 100 and one or more of computing system 200 and another electronic device 100. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device 100. In some embodiments, a Web Real-Time Communications ("WebRTC") protocols may be employed by electronic device 100. In a non-limiting embodiment, the media system may include instructions that indicate which communications protocols to employ for facilitating media transfer between devices based on a device type of electronic device 100. For example, if electronic device 100 does not include display 212 and/or camera 214, then the media system may indicate that PJSIP should be used, whereas if electronic device 100 includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210, and/or a speech-to-text ("STT") component capable of converting received audio signals into text to be sent to speech-processing system for processing.

The wakeword database may be a database stored locally by storage/memory 204 of electronic device 100, and may include a list of a current wakeword for electronic device 100, as well as one or more previously used, or alternative, wakewords for voice activated electronic device. In some embodiments, an individual may set or program a wakeword for their electronic device 100. The wakeword may be programmed directly on electronic device 100, or a wakeword or wakewords may be set by the individual via a local client application that is in communication with computing system 200. For example, an individual may use their mobile device having the computing system application running thereon to set the wakeword. The specific wakeword may then be communicated from the mobile device to computing system 200, which in turn may send/notify electronic device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100 may then begin transmitting the audio signal to computing system 200 for detecting and responds to subsequent utterances made by an individual.

In some embodiments, storage/memory 204 may store voice biometric data associated with one or more individuals. For example, an individual that operates electronic device 100 may have a registered user account on computing system 200 (e.g., within communications accounts system 278). In some embodiments, electronic device 100 may be associated with a group account, and various individuals may have user accounts that are operating under the rules and configurations of the group account. As an illustrative example, electronic device 100 may be associated with a first group account for a family that lives at a household where electronic device 100 is located. Each family member may also have a user account that is linked to the first group account (e.g., a parent, a child, etc.), and therefore each user account may obtain some or all of the rights of the first group account. For example, electronic device 100 may have a first group account registered to a particular family or group, and each of the parents and children of the family may have their own user account registered under the parent's registered account. In one illustrative embodiment, voice biometric data (e.g., acoustic features associated with audio data spoken by a particular individual) for each individual may be stored by that individual's corresponding user account. The voice biometric data, for instance, may correspond to acoustic features, such as a "voice print" or "voice model" of a particular individual, which may be a graphical representation of a person's voice including a frequency decomposition of that individual's voice. In some embodiments, a vector representing acoustic features associated with a particular individual may be generated, and the vector may also be stored as part of a particular user account's voice biometric data.

Upon receiving audio data representing an utterance, such as utterance 4 of FIG. 1, acoustic features associated with that audio data may be generated using speaker identification functionality (e.g., one or more speaker identification algorithms) stored within storage/memory 204. A vector representing the acoustic features may then be generated, where the vector may indicate the different frequency components of the spoken words over time as the utterance was spoken. The generated vector may then be compared to stored vectors from previous speaker identification training specific to a particular individual or individuals. A confidence score may be determined indicating a likelihood that the generated vector and a particular stored vector are equivalent. If the confidence score is greater than a confidence score threshold, which may be set by an individual operating device 100 and/or set by computing system 200, then this may indicate that the individual associated with the user account that the particular stored vector is associated with corresponds to the utterance's speaker. If the confidence score is less than or equal to the confidence score threshold, then this may indicate that a speaker of the utterance was unable to be identified.

In some embodiments, the speaker identification functionality may compare any generated vector to one or more reference vectors in order to try and find a match. Therefore, for each individual's user account associated with a group account, voice biometric data for that particular individual may be included. This may allow electronic device 100 to attempt and identify a speaker of a particular utterance locally. However, persons of ordinary skill in the art will recognize that electronic device 100 may not perform speaker identification processing, and alternatively speaker identification processing may be performed by computing system 200 (e.g., speaker identification system 276), or no speaker identification processing may be performed all together.

Communications circuitry 206 may include any circuitry allowing or enabling one or more components of electronic device 100 to communicate with one another, one or more additional devices, servers, and/or systems. For example, communications circuitry 206 may facilitate communications between electronic device 100 and computing system 200. As an illustrative example, audio data representing an utterance (e.g., utterance 4 of FIG. 1) may be transmitted over a network 230, such as the Internet, to computing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100 and computing system 200. In some embodiments, electronic device 100 and computing system 200 may communicate with one another via a web browser using HTTP. Various additional communication protocols may be used to facilitate communications between electronic device 100 and computing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100 may include an antenna to facilitate wireless communications with a network using various wireless technologies (e.g., Wi-Fi, Bluetooth, radiofrequency, etc.). In yet another embodiment, electronic device 100 may include one or more universal serial bus ("USB") ports, one or more Ethernet or broadband ports, and/or any other type of hardwire access port so that communications circuitry 206 allows electronic device 100 to communicate with one or more communications networks.

Electronic device 100 may also include one or more microphones 208 and/or transducers. Furthermore, one or more microphones located within a separate device may be in communication with electronic device 100 to capture sounds for electronic device 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100 may include multiple microphones (e.g., four, seven, ten, etc.) placed at various positions about electronic device 100 to monitor/capture any audio outputted in the environment where electronic device 100 is located. The various microphones 208 may include some microphones optimized for distant sounds, while some microphones may be optimized for sounds occurring within a close range of electronic device 100. In some embodiments, microphone(s) 208 may only begin to detect audio signals in response to a manual input to electronic device 100. For example, a manually activated device may begin to capture audio data using microphone(s) 208 in response to a user input, such as pressing a button, tapping a touch screen, or providing any touch input gesture to a touch input component.

Electronic device 100 may include one or more speakers 210. Furthermore, electronic device 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 100 may be located. In some embodiments, speaker(s) 210 may include headphones or ear buds, which may be wirelessly wired, or hard-wired, to electronic device 100, that may be capable of broadcasting audio directly to an individual.

In some embodiments, one or more microphones 208 may serve as input devices to receive audio inputs. Electronic device 100, in the previously mentioned embodiment, may then also include one or more speakers 210 to output audible responses. In this manner, electronic device 100 may function solely through speech or audio, without the use or need for any input mechanisms or displays, however this is merely exemplary.

Display screen 212 may correspond to a display device and/or touch screen, which may be any size and/or shape and may be located at any portion of electronic device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100. For instance, electronic device 100 may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100 may be configured to determine which pixels are associated with a particular location point, and which item or items are also displayed at that pixel location. Furthermore, electronic device 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra displays.

In some embodiments, electronic device 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100 may include multiple cameras 214, such as one or more front-facing cameras and/or one or more rear facing cameras. Furthermore, camera(s) 214 may be configured to recognize far-field imagery (e.g., objects located at a large distance away from electronic device 100) or near-filed imagery (e.g., objected located at a relatively small distance from electronic device 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100. For instance, camera(s) 214 may be external to, and in communication with, electronic device 100. For example, an external camera may be capable of capturing images and/or video, which may then be provided to electronic device 100 for viewing and/or processing.

Persons of ordinary skill in the art will recognize that, in some embodiments, display screen 212 and/or camera(s) 214 may be optional for electronic device 100. For instance, electronic device 100 may function using audio inputs, and outputting audio in response or causing one or more actions to occur in response, and therefore display screen 212 and/or camera(s) 214 may not be included. Furthermore, in some embodiments, electronic device 100 may not include display screen 212 and/or camera(s) 214, but instead may be in communication with display screen 212 and/or camera(s) 214. For example, electronic device 100 may be connected to a display screen via a Wi-Fi (e.g., 802.11 protocol) connection such that visual content sent to electronic device 100 may be sent to the display screen, and output thereby.

In one exemplary embodiment, electronic device 100 may include an additional input/output ("I/O") interface. For example, electronic device 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100 may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100. For example, one or more LED lights may be included on electronic device 100 such that, when microphone(s) 208 receive audio, the one or more LED lights become illuminated signifying that audio has been received by electronic device 100. In some embodiments, one or more vibrating mechanisms or other haptic features may be included with electronic device 100 to provide a haptic response to an individual.

In some embodiments, electronic device 100 may include radio-frequency identification ("RFID") functionality and/or near field communication ("NFC") functionality. Furthermore, in some embodiments, electronic device 100 may include one or more infrared ("IR") sensors and one or more IR emitters. The IR sensors/emitters may be used to determine depth information. For example, in one embodiment, a distance of an individual from electronic device 100 may be determined using the one or more IR sensors/emitters. Depth determination may be performed using any depth determination technique. In some embodiments, a distance between an individual and electronic device 100 may be employed as a basis for presenting content with varying density using display screen 212. In some embodiments, electronic device 100 may include beaconing functionality that allows electronic device 100 to recognize when one or more devices are located nearby. For example, electronic device 100 may include beaconing detection functionality that generates a beaconing signal, and attempts to determine whether any devices nearby are capable of detecting that signal. If so, then that may indicate that a particular device is proximate to electronic device 100.

Computing system 200 may, in some embodiments, include one or more remote devices capable of receiving and sending content from/to one or more electronic device, such as electronic device 100. Computing system, in a non-limiting embodiment, may include a speech-processing system 250 and a communications system 220. In some embodiments, speech-processing system 250 and communications system 220 may be located on a single device or server, or the functionalities of one or more of speech-processing system 250 and communications system 220 may be located on various devices and/or servers, and persons of ordinary skill in the art will recognize that the aforementioned are merely exemplary.

Speech-processing system 250, in one embodiment, may include various components and systems including, but not limited to, automatic speech recognition ("ASR") system 258, natural language understanding ("NLU") system 260, functionalities system 262, text-to-speech ("TTS") system 264, accounts system 268, and speaker identification system 270. In some embodiments, speech-processing system 250 may also include computer readable media, including, but not limited to, flash memory, random access memory ("RAM"), and/or read-only memory ("ROM"). Speech-processing system 250 may also include various systems that store software, hardware, logic, instructions, and/or commands for speech-processing system 250, or any other system, or any combination thereof.

ASR system 258 may be configured to recognize human speech in detected audio, such as audio captured by microphone(s) 208, which may then be transmitted to speech-processing system 250. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by speech-processing system 250, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

NLU system 260 may be configured such that it determines user intent based on the received audio data. For example, NLU system 260 may determine that the intent of utterance 4 is for sending a message to another messaging account, obtaining messages for a particular messaging account, and the like. In response to determining the intent of the utterance, NLU system 260 may communicate the received command to an appropriate subject matter server or skill on functionalities system 262 to perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 100, and the previous description may apply.

Functionalities system 262 may, for example, correspond to various action specific systems or servers, sometimes referred to as "skills," capable of processing various task specific actions. Functionalities system 262 may further correspond to first party applications and/or third party applications capable of performing various tasks or actions. For example, based on the context of the audio received from electronic device 100, speech-processing system 200 may use a certain functionality to generate a response, or to obtain response information, which in turn may be communicated back to electronic device 100. For instance, an utterance may ask for weather information, and therefore functionalities system 262 may access a weather application to obtain current weather information for a location associated with electronic device 100. Functionalities system 262 may also include processor(s) 252, storage/memory 254, and communications circuitry 256. In some embodiments, functionalities system 262 may be capable of communicating with communications system 220 using network(s) 230. For example, functionalities system 262 may be configured, in response to NLU system 260 determining that an intent of an utterance is associated with communications functionality, to access communications system 220 to facilitate the action(s) associated with the intent.

TTS system 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

Accounts system 268 may store one or more user accounts corresponding to users having a registered account on speech-processing system 250. For example, a parent may have a registered account on computing system 200, and each of the parent's children may have their own user account registered under the parent's registered account. In some embodiments, accounts system 268 may store voice biometric data representing voice biometric information for a specific user account. For example, acoustic features of a particular individual's voice may be stored for that individual's user account by accounts system 268. This may allow speaker identification techniques (e.g., speaker identification system 276) to be used to determine whether a generated vector corresponds to voice biometric data associated with a specific user account and/or a group account. In some embodiments, accounts system 268 may store a telephone number assigned to a particular user account, a device identifier associated with a particular device, a communications identifier associated with a particular user account and/or group account, or any other suitable information, or any combination thereof.

Speaker identification system 276, in some embodiments, may correspond to any suitable device/system capable of identifying a particular person's voice from an audio signal. Speaker identification system 276 may determine whether a current voice being used to speak matches known voice biometric data associated with a particular individual's voice. In some embodiments, voice biometric data may be stored within accounts system 268 for various individuals having a user account stored thereby. For example, individual 2 may have a user account on computing system 200 (e.g., stored within accounts system 268), which may be associated with electronic device 100. Stored within the user account may be voice biometric data associated with a voice of individual 2. Therefore, when an utterance, such as utterance 4, is detected by electronic device 100, and subsequently when audio data representing that utterance is received by computing system 200, speaker identification system 276 may determine whether the voice used to speak utterance 4 matches, to at least a predefined confidence threshold, the stored voice biometric information associated with individual 2 stored by their user account. If so, then this may indicate that individual 2 is the likely speaker of utterance 4.

In some embodiments, speaker identification system 276 may receive audio data representing an utterance, or a copy of the audio data, at a substantially same time as ASR system 258. The audio data may be divided into audio frames representing time intervals, with which a number of values or features representing qualities of the audio data may be determined, along with a set of those values (e.g., feature vectors or audio feature vectors) representing features/qualities of the audio data for each audio frame. For example, each audio frame may include 25 ms of audio, and the frames may start at 10 ms intervals. This may result in a sliding window where adjacent audio frames include 15 ms of overlapping audio. Persons of ordinary skill in the art will recognize that many different acoustic features may be determined, and each feature may be representative of a particular quality of the audio data. Some exemplary approaches that may be used to process the received audio data may include, but art not limited to, mel-frequency cepstral coefficients ("MFCCs"), perceptual linear predictive ("PLP") techniques, neural network feature vector techniques, linear discriminant analysis, and semi-tied covariance matrices. Speaker identification system 276 may also include a scoring component that determines respective confidence scores indicating how likely it is that an input utterance was spoken by a particular user.

When audio data is received by computing system 200, ASR system 258, speaker identification system 276, and/or any other suitable component of speech-processing system 250, may performing windowing functions to the audio data to generate framed audio data. The size of each audio frame may depend on a particular configuration of speech-processing system 250, and persons of ordinary skill in the art will recognize that any audio frame size may be used. For example, as mentioned previously, each audio frame may include 25 milliseconds of audio data, and may overlap with 10 milliseconds of a next audio frame, resulting in a sliding window. Performing a windowing function may include multiplying a time record by a finite-length window with an amplitude that varies smoothly and gradually toward zero at its edges. By performing windowing, endpoints of the waveforms of respective audio frames of audio data meet, resulting in a continuous waveform without sharp transitions. A fast Fourier transform ("FFT") may be performed to convert the waveforms in each audio frame of the framed audio data from its original domain (e.g., time) to a representation in a frequency domain (thereby creating frequency domain framed audio data). Audio processing techniques other than or in addition to FFT may be used to transform audio data (e.g., waveforms) into data that can be processed as needed.

In some embodiments, user recognition feature extraction may be performed on the frequency domain framed audio data. User recognition feature extraction may include performing frame level feature extraction and/or utterance level feature extraction. The frame level feature extraction may determine which frame of a universal background model ("UBM") the frame corresponds to. The UBM may be a Gaussian mixture model, a deep neural network, etc. The utterance level feature extraction may analyze aligned speech frames to derive feature vectors of fixed length (i.e., the user recognition feature/vector data). The feature extraction may continue until voice activity is no longer detected in the input audio data, at which point an endpoint of the speech may be identified and speech processing may end. Feature extraction may, in some embodiments, be performed on all the audio data received from the electronic device 100. Alternatively, feature extraction may only be performed on audio data including speech. Feature extraction and user recognition feature extraction may include determining values (i.e., features) representing qualities of the frequency domain framed audio data, along with quantitating those features into values (i.e., acoustic feature vectors or audio feature vectors). Feature extraction may determine automatic speech recognition feature/vector data, which may assist with speech recognition processing for ASR system 258, and user recognition feature extraction may determine user recognition feature/vector data, which may assist with speaker identification/user recognition for speaker identification system 276. The feature/vector data and the user recognition feature/vector data may include the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, and persons of ordinary skill in the art will recognize that any other suitable approach may be employed.

Speaker identification system 276 may perform speaker identification using various data including user recognition features/vector data, and training data that may correspond to sample audio data corresponding to known users associated with a particular device (e.g., electronic device 100). Speaker identification system 276 may generate confidence scores indicating a likelihood that a particular utterance was spoken by one of the users associated with a particular device, and may determine whether any of these confidence scores is greater than a predefined confidence score threshold. If so, then that may indicate a likelihood that a certain user is the speaker of the utterance. If two or more confidence scores are determined to be in excess of the confidence score threshold, then speaker identification system 276 may select the user having the greater confidence score, or may prompt the device to obtain additional information to resolve the speaker's identity.

In some embodiment, training data may be obtained and stored by user accounts system 268. The training data may be stored as waveforms and/or corresponding features/vectors, and may correspond to data from various audio samples, each audio sample associated with a known user and/or user identity. For example, each user known to the system may be associated with some set of training data for the known user. Speaker identification system 276 may then use the training data to compare against incoming audio data (represented by user recognition feature/vector data) to determine an identity of a user speaking an utterance. The training data may be associated with multiple users of multiple devices and therefore may be associated with both a user that spoke the respective utterance, as well as electronic device 100, which provided the audio data representing the spoken utterance.

The training data for a particular user may include a feature vector of the same size as a vector of the user recognition feature/vector data. Thus, for example, if a feature vector is of size F, the training data may also be a feature vector of size F. To create such a training data feature vector, during a training period computing system 200 may either prompt a user to speak sample audio data or may identify sample audio data known to have been spoken by a particular user. The system may then process the sample audio data to create sample training data (e.g., a feature vector of size F). The training data may then be stored by user accounts system 268 and saved for use during runtime user verification processing.

In some embodiments, speaker identification processing may further include various additional techniques to determine a speaker of an utterance. For example, device beaconing may indicate a likelihood that a particular individual's device is located proximate to electronic device 100. In this particular scenario, if an individual's device is determined to be substantially close to electronic device 100 at a time when the wakeword is uttered, then this may indicate that the wakeword was likely spoken by that individual. As another example, historical rules may be employed to determine a speaker of an utterance. For example, one particular individual may typically interact with electronic device 100, and therefore it may be more likely that when a wakeword is detected by electronic device 100, that wakeword is more likely than not spoken by that particular individual. Still further, certain individuals may be interact with electronic device 100 during certain times, or to perform certain functions. For example, a particular individual may typically ask for a weather forecast using electronic device 100 during a particular time frame (e.g., between 8 and 9 o'clock). In this particular scenario, if the wakeword is determined to have been uttered during that time frame, then this may indicate that there is a high likelihood that a speaker of the wakeword (and the corresponding utterance) is that individual. As another example, if a particular individual has just performed a specific function, such as sending a message to another individual, then if the wakeword is detected by electronic device 100 temporally after, and within a certain amount of time of, the specific function, then this may indicate that that individual likely spoke the corresponding utterance. Persons of ordinary skill in the art will recognize that various additional techniques may be employed to determine a speaker of an utterance, and the aforementioned are merely exemplary.

Persons of ordinary skill in the art will recognize that although each of ASR system 258, NLU system 260, subject matter/skills system 262, TTS system 264, accounts system 268, and speaker identification system 270 may each include instances of processor(s) 252, storage/memory 254, and communications circuitry 256, and those instances of processor(s) 252, storage/memory 254, and communications circuitry 256 within each of ASR system 258, NLU system 260, functionalities system 262, TTS system 264, and accounts system 268 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Computing system 200 may also include, in a non-limiting embodiment, communications system 220, which may be capable of facilitating a communications session between electronic device 100 and one or more additional devices, and/or providing communications to electronic device 100. For example, communications system 220 may employ VoIP functionality to facilitate audio, video, and/or text data communications between the initiating device and the recipient device. In some embodiments, communications system 220 may establish a communications session between an initiating device and a recipient device using one or more VoIP protocols including, but not limited to SIP, RTP, RTCP, SRTP, and SDP. In one illustrative embodiment, a SIP signaling command may be provided to communications system 220 for communicating with the recipient device. In particular, PJSIP functionality adds a new "user-to-user" header that indicates the device pair for the communications session.

In one embodiment, communications system 220 may include a messaging rules/prioritization system 272, in a non-limiting embodiment, which may include any suitable rules and/or prioritization schemes for organizing and group messages received for one or more user accounts and/or group accounts. For example, messaging rules/prioritization system 272 may include rules that cause messages having similar sender information to be grouped together. As another example, messages received within a certain amount of time of a request for messages may be indicated as having a higher priority than messages received later on. In some embodiments, messaging rules/prioritization system 272 may be configured to weight each message received for a particular user account and/or group account, where the weighting may be used to rank the messages for playback. Messaging having a highest ranking would, therefore, be output first, while messages having a lowest ranking would be output last. As an illustrative example, two messages received for a user account having the same sender information (e.g., sent by a same sender) may receive a higher weighting than another message received for the user account having different sender information.

In some embodiments, messaging rules/prioritization system 272 may include one or more rules to prioritize messages for playback. Such rules may include, but are not limited to, playback rules based on speaker identification, sender information, urgency of a message, vocal inflection, temporal aspects of the message, and/or content of the message. In one example, messages received for a particular user account may be output prior to messages received for a group account. In this instance, the messages for a user account may be obtained if the speaker identification processing is capable of positively identifying the speaker of the corresponding utterance. In another example, messages received from a particular sender may be designated as being higher priority messages than those received from other senders. Similarly, messages flagged by a sender as being urgent messages may be weighted greater than messages not flagged as being urgent. In this way, a message that is indicated as being urgent may be output prior to a message indicated as being non-urgent. In some embodiments, content recognition of a message may be employed to determine an importance of a message and, based on the importance, that message may be weighted accordingly for prioritization. For example, contextual recognizer system 270 may analyze text data representing audio data generated by ASR system 258 and may determine, using keyword spotting technology, whether any words used within the message indicate that that message is an important message that should be output prior to other messages.

Communications system 220 may also include a message database 274. Message database 274 may correspond to any suitable database capable of storing messages, or any other type of communication (e.g., telephone calls, text messages, emails, etc.). Message database 274 may store each message that has been received with a corresponding user account or group account with which that message is directed to. For example, messages sent to an individual's user account may be stored by message database 274 for that user account, while messages sent to the individual's group account may be stored for that group account. In some embodiments, user accounts and group accounts may both receive messages that have been received for one or another, if those user accounts and group accounts are associated with one another.

Message database 274 may also generate and store message metadata corresponding to each message that has been received for a particular user account and/or group account. The message metadata may include such message information as a timestamp indicating a time that a message was received, sender information associated with a sender of a message, urgency information indicating an urgency of a particular message, similar messages that have been received (e.g., indicators of messages received from a same sender), and the like. In some embodiments, message database 274 may monitor a number of messages that have been received for a particular user account and/or group account, and may generate and store message metadata indicating the number of messages that have been received. For example, each time a new message is received for a user account, message metadata may be updated to indicate that a number message was received, sender information corresponding to that message, and a timestamp indicating a time that the message was received.

Contextual recognizer system 270, in one embodiment, may be configured to perform keyword spotting processing to text data generated by ASR system 258. For instance, in response to receiving audio data representing an utterance, ASR system 258 may generate text data representing the audio data using speech-to-text system 266. In addition to providing NLU system 260 with the text data, contextual recognizer system 270 may analyze the text data to determine whether any keywords indicating an importance, urgency, subject, or, more generally, a context, of that message. For example, if an individual sends a message including an utterance of the word "urgent," then contextual recognizer 270 may spot that keyword from the text data representation of the message, and may determine that that message corresponds to an urgent message. Contextual recognizer system 270 may then provide that message to messaging rules/prioritization system 272 with an indication that that message is to be stored as an urgent message.

In some embodiments, contextual recognizer system 270 may analyze the message to determine a recipient of the message, and may compare that recipient to an indicated recipient determined by NLU system 260. For instance, if an individual says, "Send a message to <Contact Identifier 1>: Hey <Contact Identifier 2> . . . ," then NLU system 260 may determine that the recipient of this message should be <Contact Identifier 1>, whereas contextual recognizer 270 may determine that the recipient should be <Contact Identifier 2>. In this particular scenario, contextual recognizer system 270 may cause that message to be redirected to a user account or group account corresponding to <Contact Identifier 2>, however persons of ordinary skill in the art will recognize that this is merely exemplary.

In one embodiment, communications system 220 may include communications accounts system 278 may also store one or more group accounts corresponding to one or more shared devices. For example, a shared device, such as shared electronic device 100, may have its own group account stored on communications accounts system 278. The group account may be associated with the shared device, and may also be linked to one or more individual's user accounts. For example, shared electronic device 100 may be associated with a first group account corresponding to a first grouping of individual (e.g., a family). One or more user accounts may also be associated with the first group account (e.g., individual members of the family), corresponding to individuals that may be capable of interacting with shared electronic device 100. Information, settings, and/or preferences, for example, for each user account may be stored within a user account database. In some embodiments, communications accounts system 278 and accounts system 268 may communicate with one another via network 230 to provide one another with account information associated with certain devices and communications accounts. For example, user accounts system 268 may store voice biometric data for a particular user account, which may then be provided to communications accounts system 278 to determine a communications identifier and/or other communications information associated with that user account so as to allow a device associated with the user account to communicate with one or more additional devices.

Figure 3:
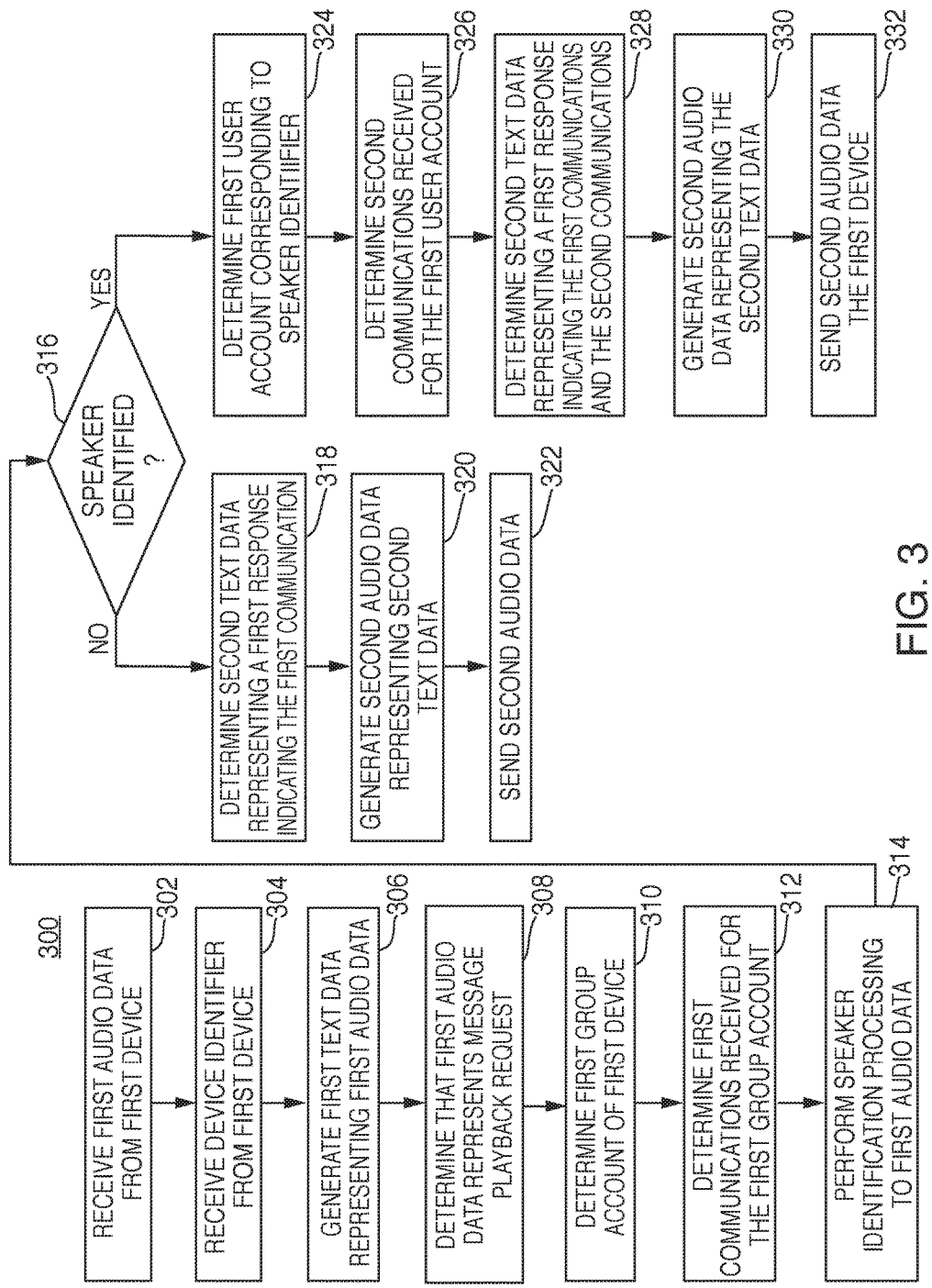
FIG. 3 is an illustrative flowchart of an exemplary process for providing responses indicating communications that have been received by a user account and/or a group account, in accordance with various embodiments.

FIG. 3 is an illustrative flowchart of an exemplary process for providing responses indicating communications that have been received by a user account and/or a group account, in accordance with various embodiments. In a non-limiting embodiment, process 300 may begin at step 302. At step 302, first audio data may be received from a first device. For example, audio data representing utterance 4 may be received by computing system 200, and in particular speech-processing system 250, from shared voice activated electronic device 100. For instance, in response to detecting that a wakeword (e.g., "Alexa") for the first device has been uttered, the first device may begin sending audio data representing the sounds recorded by one or more microphones of the first device subsequently following the wakeword.

At step 304, a device identifier for the first device may be received by computing system 200. The device identifier, for example, may correspond to a MAC address, an IP address, a serial number, or any other communications identifier, or any combination thereof for the first device. In some embodiments, the device identifier may be sent by the first device with the first audio data. For example, the device identifier may be included as a header of the first audio data. However, in another embodiment, the device identifier may be received prior to, at a substantially same time, or after, the first audio data is sent by the first device to computing system 200.

At step 306, first text data may be generated representing the first audio data. For instance, upon receipt, speech-processing system 250 may provide the audio data representing the utterance (e.g., utterance 4) to ASR system 258. ASR system 258 may then generate text data representing the audio data using STT system 266.

At step 308, it may be determined that the first audio data representing a message playback request. Speech-processing system 250 may provide NLU system 260 with the text data that has been generated, and NLU system 260 may determine an intent of the utterance based on the text data. For example, the text data may be compared to one or more sample utterances to determine an intent. For instance, if the text data substantially matches a sample utterance framework, "<Wakeword>, Play my messages," then that may indicate that the utterance corresponds to a request for messages to be played. Various other sample utterances that may also correspond to message playback request include, but are not limited to, "<Wakeword>, what are my messages?", "<Wakeword>, what are the messages?", "<Wakeword>, what's the message?", "<Wakeword>, read/play all messages,"<Wakeword>, what are the messages for <Recipient Name>?", and "<Wakeword>, what are messages from <Contact Name>?".

At step 310, a first group account associated with the first device may be determined. In some embodiments, communications system 220 and/or speech-processing system 250 of computing system 200 may include a communications table that includes a listing of group accounts associated with particular device identifiers. For example, the communications table may be stored by communications accounts system 278, and may include device identifiers, and the corresponding group accounts that are associated with those device identifiers. When computing system 200 receives a device identifier along with audio data, that device identifier may be used to determine a group account that the corresponding device that the audio data was received from is associated with. For example, a device identifier for the first device (e.g., shared voice activated electronic device 100) may correspond to a first group account. Therefore, in this particular scenario, the first group account may correspond to a group account associated with the first device.

At step 312, it may be determined that first communications have been received for the first group account. In some embodiments, the first communications may correspond to one or more audio messages, text messages, video messages, picture messages, hyperlinks, telephone calls, VOIP communications, or any other type of communication, that may have been received for the first group account. For instance, communications system 200 may access message database 274 to determine a number of communications that have been received for the first group account. Communications metadata indicating the number of communications, as well as sender information and temporal information associated with these communications, may also be obtained from the message database. As an illustrative example, message database 274 may indicate that <Number of Messages Received for Group Account>: one message was received for the group account from <Sender 1>: the Smiths (e.g., summary response 6). Therefore, message metadata may be obtained from message database 274 indicating that the group account associated with voice activated electronic device 100 received one message from a sender named the "Smiths."

At step 314, speaker identification processing may be performed to the first audio data. In some embodiments, speaker identification system 276 may receive the first audio data, or a copy of the first audio data, and may perform speaker identification processing to the first audio data to generate a speaker identifier of the first audio data. For example, acoustic features associated with the first audio data (e.g., a graphic representation of the component frequencies of an utterance over a period of time) may be generated, and a vector representing the acoustic features may be generated. At step 316, a determination may be made as to whether or not the speaker was able to be identified. In some embodiments, the speaker identifier that was generated by the speaker identification processing may be compared with voice biometric data associated with the first group account. For instance, stored vectors associated with one or more user accounts of the first group account may be compared to the generated vector, and a confidence score indicating a likelihood that the two vectors match may be determined.

If, at step 316, the speaker was not able to be identified, then process 300 may proceed to step 318. For instance, in this particular scenario, speaker identification system 276 may have determined that a confidence score comparing the generated vector to a stored vector included by voice biometric data associated with the first group account was less than a predefined confidence score threshold. In this particular scenario, this may indicate that a speaker was unable to be identified. However, in some embodiments, at step 316, if speaker identification processing is not available, either for the first device or generally, then process 300 may also proceed to step 318.

At step 318, second text data representing a first response indicating that the first communications were received for the first group account may be determined. In some embodiments, the particular response may depend on various factors including, but not limited to, a number of communications that were received for the first group account, sender information associated with the communications, and/or whether any user accounts associated with that group account also received communications. For instance, the first group account may also be associated with one or more user accounts. Although speaker identification processing may not have been able to identify the speaker of the request, at step 318, a determination may also be made as to a number of communications that have been received for any of these user accounts, and that information may be provided to the requesting individual using the selected summary response. As an illustrative example, if the group account received one message, then an exemplary summary response may be, "One message for <Group Account Identifier> from <Sender Identifier>." A listing additional example summary responses, and various rules for selecting summary responses, are described below with reference to Tables 1-8.

At step 320, second audio data representing the second text data may be generated. For instance, after the summary response has been determined at step 318, and the appropriate information has been obtained for the summary response, then speech-processing system 250 may provide the summary response to TTS system 264 to generate audio data representing the summary response. For example, the summary response may be text data, and therefore TTS system 264 may generate audio data representing the text data. At step 322, the second audio data may be sent to the first device such that the summary response is output by the first device. For example, the summary response, "One message for <Group Account Identifier> from <Sender Identifier> may be caused to be output by shared voice activated electronic device 100.

In some embodiments, after the summary response is generated and sent to the first device, audio data representing the communications associated with the summary response may be sent to the first device to be output. For example, if one or more messages were received for a group account, then after the summary response is played indicating the messages that were received, the messages may be played by the first device. In some embodiments, an option to play the messages may be provided instead of automatically causing the messages to output. For example, a follow-up message may be output, "Do you want to hear the message(s)?". Therefore, the requesting individual may be provided with an option for how he/she would like to consume the messages that have been received for their group account, as well as for any user accounts associated with the group account of the first device. A summary of such exemplary responses is described in greater detail below with reference to Tables 1-8.

If, at step 316, the speaker was able to be identified (e.g., the confidence score was determined to be greater than the predefined confidence score threshold), then process 300 may proceed to step 324. At step 324, a first user account corresponding to the stored vector that was determined to match the generated vector corresponding to the first audio data may be determined. This may indicate that the utterance was likely spoken by an individual associated with the first user account. At step 326, second communications received for the first user account may be determined. For instance, similarly to how the first communications were received for the first group account, the second communications received for the first user account may be determined.

At step 328, second text data representing a first response indicating that the first communications and the second communications were received may be determined. In some embodiments, communications received for a user account may be provided prior to messages received for a corresponding group account. For example, messages received for individual 2 may be indicated within summary response 6 prior to messages received for a group account of individual 2. In some embodiments, the particular summary response that is selected may depend on various factors including, but not limited to, a number of communications that were received for the first user account, a number of communications that were received for the first group account, sender information associated with the communications, and/or whether any other user accounts associated with that group account also received communications. For instance, in addition to the first user account, the first group account may also be associated with a second user account corresponding to a second individual. If the second user account also received messages, then the summary response may also indicate that the second user account received messages, as well as sender information associated with those messages. Various example summary responses that may be used when a speaker of an utterance was able to be identified may be described in Tables 1-8.

At step 330, second audio data representing the second text data may be generated. At step 332, the second audio data may be sent to the first device such that the summary response may be output by the first device. In some embodiments, steps 330 and 332 may be substantially similar to steps 320 and 322, and the previous descriptions may apply.

Table 1 is an illustrative table indicating additional tables associated with different summary responses based on whether or not speaker identification processing was able to positively identify a speaker of a request for messages to be played. In Tables 2-7, missed calls and other communication types are omitted for simplicity, however persons of ordinary skill in the art will recognize that similar rules may be implemented for any suitable type of communication.

TABLE 1

| | | Number of Messages > 1 | |
|---|---|---|---|
| Example Utterance | Number of Messages = 1 | All Messages for Single Recipient | Messages for Different Recipients |
| "What are my Messages?" Speaker ID unable to identify speaker, or not available. | Table 2 | Table 3 | |
| "What are my Messages?" Speaker ID able to identify speaker. | Table 4 | Table 5 | Table 6 |

TABLE 1-continued

| | | Number of Messages > 1 | |
|---|---|---|---|
| Example Utterance | Number of Messages = 1 | All Messages for Single Recipient | Messages for Different Recipients |
| "What are the messages for <User Name>?" Speaker ID not needed. | | Table 7 | Table 7 |

Table 2 is an illustrative table indicating summary responses that may be used to respond to requests for message playback, as well as missed calls that have been received, for a group account and/or one or more user account if speaker identification processing was unable to identify a speaker of the request, or if speaker identification process was not available.

TABLE 2

| Scenario | Recipient | Summary Response | Message Playback |
|---|---|---|---|
| A | Group Account | "One message for <Group Account Identifier> from <Sender Identifier>" | "<Message 1>" "Received at <timestamp>" |
| B | User Account (Two or User Accounts Available) | "One message for <User more Account Identifier>" | "Do you want to hear it?" Listen for "Yes/No" If "Yes," play message. "Received at <timestamp>" |
| C | User Account (One Available) | "One message from <Sender Identifier>" | "<Message 1>" "Received at <timestamp>" |

In some embodiments, the message playback option may cause the corresponding message to be played after the summary response has been output. For example, after the summary response, "One message from <Sender Identifier>," has played, then the one message, "<Message 1>," may play. In some embodiments, if the request to playback the messages is received later than a certain amount of time after the message was received, then a timestamp indicating a time that the message was received may also be played. For instance, if the request is received more than 15 seconds after the message was received, then the follow-up response, "Received at <timestamp>" may be played after the message, or prior to the message (e.g., after the summary response).

Table 3 is an illustrative table indicating various example summary responses and message playback options that may be employed if speaker identification processing is unable to identify a speaker of a request to playback messages, or if speaker identification processing is not available, and, in this particular instance, if more than one message was received for a particular group account, or a user account associated with that group account.

TABLE 3

| Scenario | Recipients | Summary Response | Message Playback Option | Follow-Up Response |
|---|---|---|---|---|
| 1 | Group Account Messages = 0; User Accounts | "<User Account 1 Number of Messages>" | N/A | If 1 Recipient: # of Messages = 1: |

TABLE 3-continued

| Scenario | Recipients | Summary Response | Message Playback Option | Follow-Up Response |
|---|---|---|---|---|
| | Messages ≥ 2 | message(s) for <User Account 1 Identifier>, "<User Account 2 Number of Messages> message(s) for <User Account 2 Identifier>, | | "Do you want to hear it? " # of messages > 1: "Do you want to hear them? " |
| 2 | Group Account Messages ≥ 2; User Accounts Messages = 0 (One Sender) | "<Number of Messages for Group Account> message(s) for <Group Account Identifier> from <Sender Information>" | "<Message 1> received at <timestamp 1>, . . . , <Message N> received at <timestamp N>" | N/A |
| 3 | Group Account Messages ≥ 2; User Accounts Messages = 0 (Multiple Senders) | "<Number of Messages for Group Account> messages for <Group Account Identifier>" | Most recent message playback first. | Messages ≥ 1, 1 Recipient: "Do you want to hear <User Account Identifier> message(s)?" 2 or more Recipients: "If you want to hear messages for a specific user, say . . . " |
| 4 | Group Account Messages ≥ 1; User Accounts Messages ≥ 1 (Group Account Messages from one sender) | <Number of Messages for Group Account> message(s) for <Group Account Identifier>, <Number of Messages for User Account 1> message(s) for <User Account 1 Identifier>, . . . " | "For <Group Account Identifier> from <Sender Information>" "<Message 1> received at <timestamp 1>" | Messages ≥ 1, 1 Recipient: "Do you want to hear <User Account Identifier> message(s)?" 2 or more Recipients: "If you want to hear messages for a specific user, say . . . " |
| 5 | Group Account Messages ≥ 1; User Accounts Messages ≥ 1 (Group Account Messages from multiple senders) | "<Number of Messages for Group Account> message(s) for <Group Account Identifier>, <Number of Messages for User Account 1> message(s) for <User Account 1 Identifier>, . . . " | "For <Group Group Account Identifier> from <Sender Information>" "<Message 1> received at <timestamp 1>" | Messages ≥ 1, 1 Recipient: "Do you want to hear <User Account Identifier> message(s)?" 2 or more Recipients: "If you want to hear messages for a specific user, say . . . " |

In the illustrative embodiment of Table 3, if one or more messages are received for a group account, then the summary response may indicate that number of messages first, followed by the number of messages received for any user accounts associated with that group account. For instance, if one message was received for the group account, and one message was received for a user account, then the summary response may be, "One message for <Group Account Identifier>, and one message received for <User Account Identifier>." In the illustrative example, <Group Account Identifier> corresponds to an identifier used for the group account (e.g., the Smiths, or the Jones household), and <User Account Identifier> may correspond to an identifier used for a user account (e.g., Frank, or Johnny).

Table 4 is an illustrative table indicating various example summary responses and message playback options that may be employed if speaker identification processing is able to identify a speaker of a request to playback messages, and if one message was received for a particular group account, or a user account associated with that group account.

TABLE 4

| Scenario | Recipients | Summary Response | Message Playback Option |
|---|---|---|---|
| 1 | Group Account | "One message for <Group Account Identifier> from <Sender Identifier>" | "<Message>," "Received at <timestamp>" |
| 2 | Identified Speaker's User Account | "<User Account Identifier>, you have one message from <Sender Identifier>" | <Message>, "Received at <timestamp>" |
| 3 | Other User Account | "One message for <User Account Identifier>" | "Do you want to hear it?" |

In the illustrative embodiment of Table 4, <User Account Identifier> corresponds to an identifier assigned to a particular user account. For example, in utterance 4 of FIG. 1, <User Account Identifier>: "John." After the summary response is output, the message, as well as a timestamp indication may be output. If, for example, messages are received for a user account other than the user account of the identifier speaker, such as in Scenario 3, then an option may be provided to hear the messages for that user account. In this particular scenario, the corresponding device (e.g., voice activated electronic device 100) may continue receiving audio data representing sounds captured by microphone(s) 208, to determine whether or not a "Yes" or a "No" was uttered. If "Yes" was uttered, then the messages may be caused to play, whereas if "No" was uttered, the messages may not be played.

Table 5 is an illustrative table indicating various summary responses for messages received for a group account of an identified speaker, a user account of an identified speaker, or user accounts associated with a group account of an identified speaker. For simplicity, message playback and follow-up responses have been omitted, as similar rules as seen by Tables 2-4 may apply.

TABLE 5

| Scenario | Recipient(s) | Summary Response |
|---|---|---|
| 1 | Messages For Identified Speaker's User Account = 0; Messages for Group Account = 0; Messages for Additional User Accounts ≥ 2 | "<Number of Messages Received for User Account 1> message(s) for <User Account 1 Identifier>, . . . <Number of Messages Received for User Account N> message(s) for <User Account N Identifier>" |
| 2 | Messages For Identified Speaker's User Account = 0; Messages for Group Account ≥ 2; Messages for Additional User Accounts = 0 | "<Number of Messages for Group Account> message(s) received for <Group Account Identifier> from <Sender 1>" |
| 3 | Messages For Identified Speaker's User Account ≥ 2; Messages for Group Account = 0; Messages for Additional User Accounts = 0 | "<Identifier Speaker's User Account>, you have <Number of Messages for User Account> message(s) from <Sender Identifier>" |
| 4 | Messages For Identified Speaker's User Account ≥ 2; Messages for Group Account = 0; Messages for Additional User Accounts = 0 | "<Identifier Speaker's User Account>, you have <Number of Messages for User Account from Sender 1> message(s) from <Sender 1>, . . . <Number of Messages for User Account from Sender N Identifier> message(s) from <Sender N Identifier>" |

In the illustrative embodiment of Table 5, messages from different senders are output after one another. In some embodiments, one or more additional rules for which messages to output first based on the particular sender, as well as, or alternatively, based on other sender information, may be applied. For instance, certain senders may be indicated as being high priority senders, and therefore messages received from those user accounts may be output prior to messages sent from non-high priority senders.

Table 6 is an illustrative table indicating various summary responses for messages received for two or more of a group account of an identified speaker, a user account of an identified speaker, and/or user accounts associated with a group account of an identified speaker. For simplicity, message playback and follow-up responses have been omitted, as similar rules as seen by Tables 2-4 may apply.

TABLE 6

| Scenario | Recipients | Summary Response |
|---|---|---|
| 1 | Messages For Identified Speaker's User Account = 0; Messages for Group Account ≥ 1; Messages for Additional User Accounts ≥ 1 | "<Number of Messages Received for Group Account> message(s) for <Group Account Identifier>, and <Number of Messages for User Account 1> message(s) received for <User Account 1>, . . . and <Number of Messages for User Account N> message(s) received for <User Account N>" |
| 2 | Messages For Identified Speaker's User Account ≥ 1; Messages for Group Account = 0; Messages for Additional User Accounts ≥ 1 | "<Identified Speaker User Account Identifier>, you have <Number of Messages Received for Identified Speaker User Account> message(s). Also, <User Account 1> has <Number of Messages for User Account 1> message(s), . . . and <Number of Messages for User Account N> message(s) received for <User Account N>" |
| 3 | Messages For Identified Speaker's User Account ≥ 1; Messages for Group Account ≥ 1; Messages for Additional User Accounts = 0 | "<Identified Speaker User Account Identifier>, you have <Number of Messages Received for Identified Speaker User Account> message(s). Also, <Group Account Identifier> has <Number of Messages for Group Account> message(s)." |
| 4 | Messages For Identified Speaker's User Account ≥ 1; Messages for Group Account ≥ 1; Messages for Additional User Accounts ≥ 1 | "<Identified Speaker User Account Identifier>, you have <Number of Messages Received for Identified Speaker User Account> message(s). Also, <Group Account Identifier> has <Number of Messages for Group Account> message(s)." |

Table 7 is an illustrative table indicating various summary responses for playback of messages for a particular user account based on a user account identifier that is included within an utterance. For simplicity, message playback and follow-up responses have been omitted, as similar rules as seen by Tables 2-4 may apply.

TABLE 7

| Scenario | Recipients | Summary Response |
|---|---|---|
| 1 | Specified User Account, messages from one sender | "<Number of Messages for Specified User Account> message(s) for <User Account Identifier>" |
| 2 | Specified User Account, messages from multiple senders | "<Number of Messages for Specified User Account> message(s) for <User Account Identifier>" |

TABLE 7-continued

| Scenario | Recipients | Summary Response |
|---|---|---|
| 3 | Specified User Account, no messages | "No new messages" |

Figure 4:
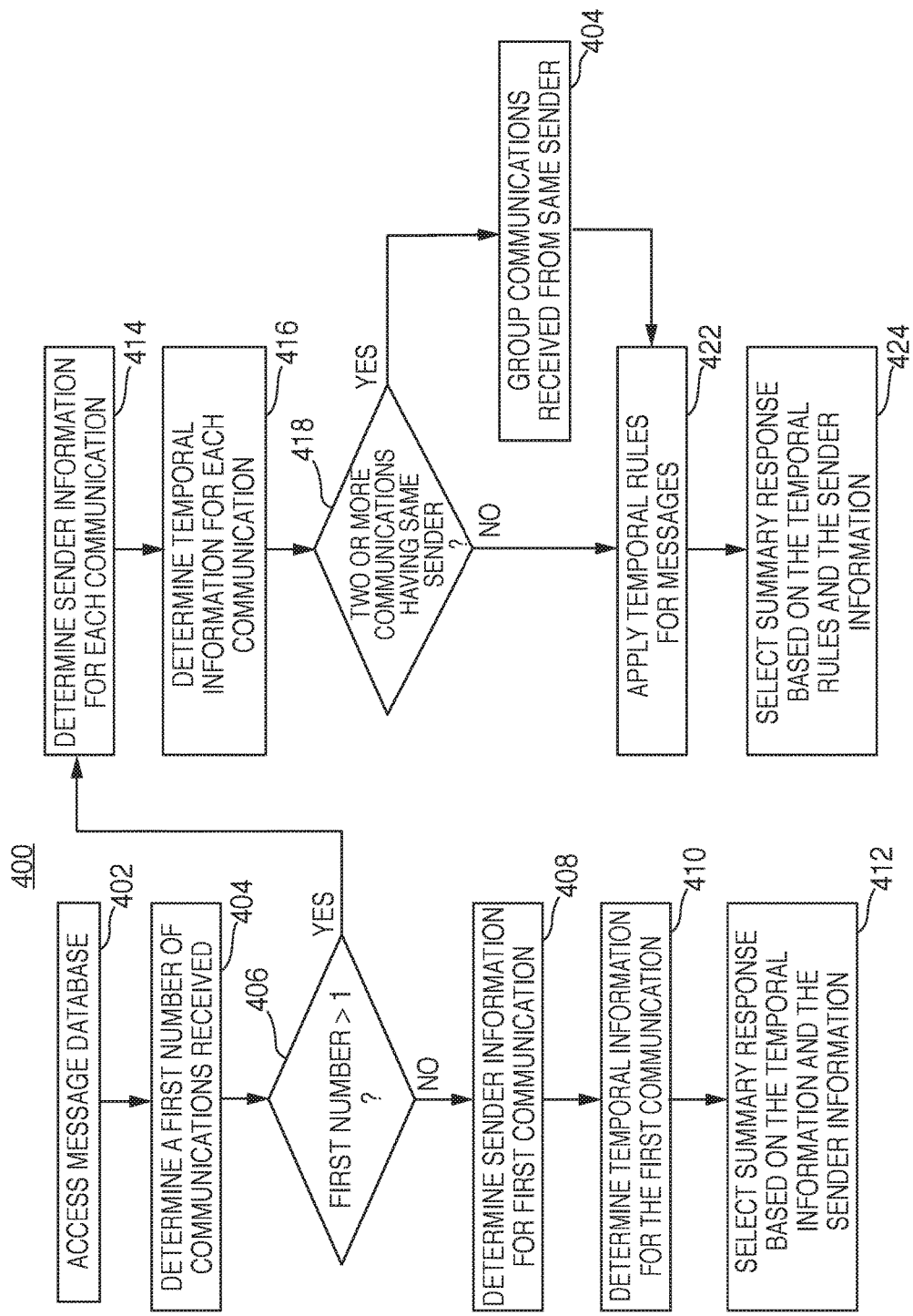
FIG. 4 is an illustrative flowchart of an exemplary process for using temporal messaging rules for message playback, in accordance with various embodiments.

FIG. 4 is an illustrative flowchart of an exemplary process for using temporal messaging rules for message playback, in accordance with various embodiments. In the non-limiting embodiment, process 400 may begin at step 402. At step 402, a message database may be accessed. For instance, message database 274 may be accessed. In some embodiments, message database 274 may be accessed for a particular group account, as well as for a particular user account. For example, based on a device identifier received by computing system 200, and in particular, communications system 220, a group account associated with shared electronic device 100 may be determined, and message database 274 may be accessed for that particular group account. As another example, based on a speaker identifier associated with a particular user account, message database 274 may be accessed for that particular user account.

At step 404, a first number of communications that have been received may be determined. In some embodiments, the number of communications may correspond to the number of communications received for the group account, a user account of a speaker identified, and/or one or more additional user accounts associated with that group account. At step 406, a determination may be made as to whether or not the first number of communications is greater than one. In some embodiments, if no messages were received, then this may simply correspond to a scenario where a summary response indicating that no messages were received is selected, and audio data representing this summary response is generated and provided to the requesting device. If, at step 406, it is determined that the first number of messages is not greater than one, then process 400 may proceed to step 408.

At step 408, sender information associated with a first communication may be determined. For example, a group account may have received one message from a first sender having a sender identifier <Sender Identifier>. At step 410, temporal information for the first communication may be determined. In some embodiments, the temporal information may correspond to temporal metadata indicating a time that the first communication was received. For example, the temporal information may include <timestamp> indicating a first time that the first communication was received. At step 412, a summary response may be selected based on the temporal information and the sender information determined previously. For instance, a summary response indicating that one message was received from a first sender and a first time may be selected. As an illustrative example, a summary response having the format "One message was received at <timestamp> from <Sender Identifier>." In some embodiments, the summary response may be selected based on one or more timestamp rules, such as those described in Table 8 below.

TABLE 8

| Temporal Rules | Summary Response |
|---|---|
| Received time <= 60 seconds ago | "Received just now" |
| Received time <= 5 minutes ago | "Received in the last 5 minutes" |
| Received time <= 10 minutes ago | "Received in the last 10 minutes" |
| 10 minutes < received time <= 50 minutes ago | "Received about <round to nearest multiple of 10> minutes ago" |
| 50 minutes < received time <= 1 hr 15 minutes ago | "Received about an hour ago" |
| 1 hr 15 minutes < received time <= 4 hr 15 minutes ago | "Received about <round to nearest hour or hour and half> ago" |
| today evening (received time >= 6 pm) | "Received this evening" |
| today afternoon (noon <= received time < 6 pm) | "Received this afternoon" |
| today morning (midnight <= received time < noon) | "Received this morning" |
| yesterday (received date is yesterday) | "Received yesterday" |
| Not today, not yesterday, but within last 6 days | "Received on <day of week>" |
| Older than 6 days, but within this calendar year | "Received on month + date" (e.g. Received on July 6$^{th}$) |
| Previous calendar year | "Received last year" |
| Not this year, not previous year, but earlier | "Received in <year>" |

In some embodiments, an amount of time between when the first communication was received and a time that the request to play messages was received may be determined. Based on the difference, an appropriate summary response may be selected from Table 8 to use to respond to the request. As an illustrative example, if the request to play messages was received at 3:00 PM, and the first communication was received at 2:52 PM, then the selected summary response may be, "Received in the last ten minutes." For instance, the complete summary response may be, "You have one message that was received in the last ten minutes." Persons of ordinary skill in the art will recognize that Table 8 is merely exemplary, and any suitable temporal rule for responding to message playback requests may be employed.

If, at step 406, it is determined that more than one communication was received, then process 400 may proceed to step 414. At step 414, sender information (e.g., a sender's messaging account) corresponding to each communication may be determined. For example, if two messages were received (e.g., <Message 1> and <Message 2>), then sender information for both messages (e.g., <Sender Identifier 1> for <Message 1> and <Sender Identifier 2> for <Message 2>) may be determined. At step 416, temporal information for each communication that was received may be determined. Continuing the previous example, for the two messages received, temporal metadata indicating a time that each of the two messages was received, may be determined (e.g., <timestamp 1> for <Message 1>, and <timestamp 2> for <Message 2>).

At step 418, a determination may be made as to whether or not two or more of the received communications have a same messaging account. For instance, a determination may be made as to whether <Sender Identifier N> equals <Sender Identifier M>, where N and M correspond to different messages (e.g., <Sender Identifier 1> for <Message 1> and <Sender Identifier 2> for <Message 2>). If, at step 418, it is determined that two or more of the communications correspond to a same sender identifier, then process 400 may proceed to step 420. At step 420, the two or more communications received from the same sender's messaging account may be grouped together. For example, if a first message and a second message were received from a same sender, then those messages may be grouped together so that, when output, a requesting individual may hear both messages substantially together. After step 420, process 400 may proceed to step 422. However, if at step 418 it is determined that there are no two messages that have a same sender, then process 400 may proceed to step 422.

At step 422, temporal rules for the communications that have been received may be applied, and at step 424, a corresponding summary response may be selected based on the temporal rules and the sender information. For example, Table 8 may include a listing of some exemplary temporal rules that may be used. For instance, a difference between a receipt time of a particular communication, and a receipt time of a request, may be determined, and compared to the listing of temporal rules to determine an appropriate summary response to use. In some embodiments, if two or more communications are received from a same sender, then those two communications may be grouped together, and the appropriate temporal rule for the grouping of communications may be applied. As an illustrative example, if a first message was received at 3:00 PM, and a second message from the same sender was received at 4:10 PM, and a request was received at 4:15 PM, then an example summary response may be, "Both received about an hour and a half ago." In some embodiments, the aforementioned summary responses may be employed after the corresponding communications are provided to a requesting device. For example, after playing the first message and the second message, the summary response, "Both received about an hour and a half ago," may be played. If more than two messages were received, then the summary response may be, "All received <timestamp readout>." For example, if a first message was received at 3:00 PM, a second message received at 3:02 PM, and a third message received at 3:05 PM, and the request to output messages was received at 4:30 PM, then speech-processing system 200 may generate audio data representing the messages and the summary response, "<Message 1>, <Message 2>, <Message 3>, all received about an hour and a half ago."

Figure 5A:
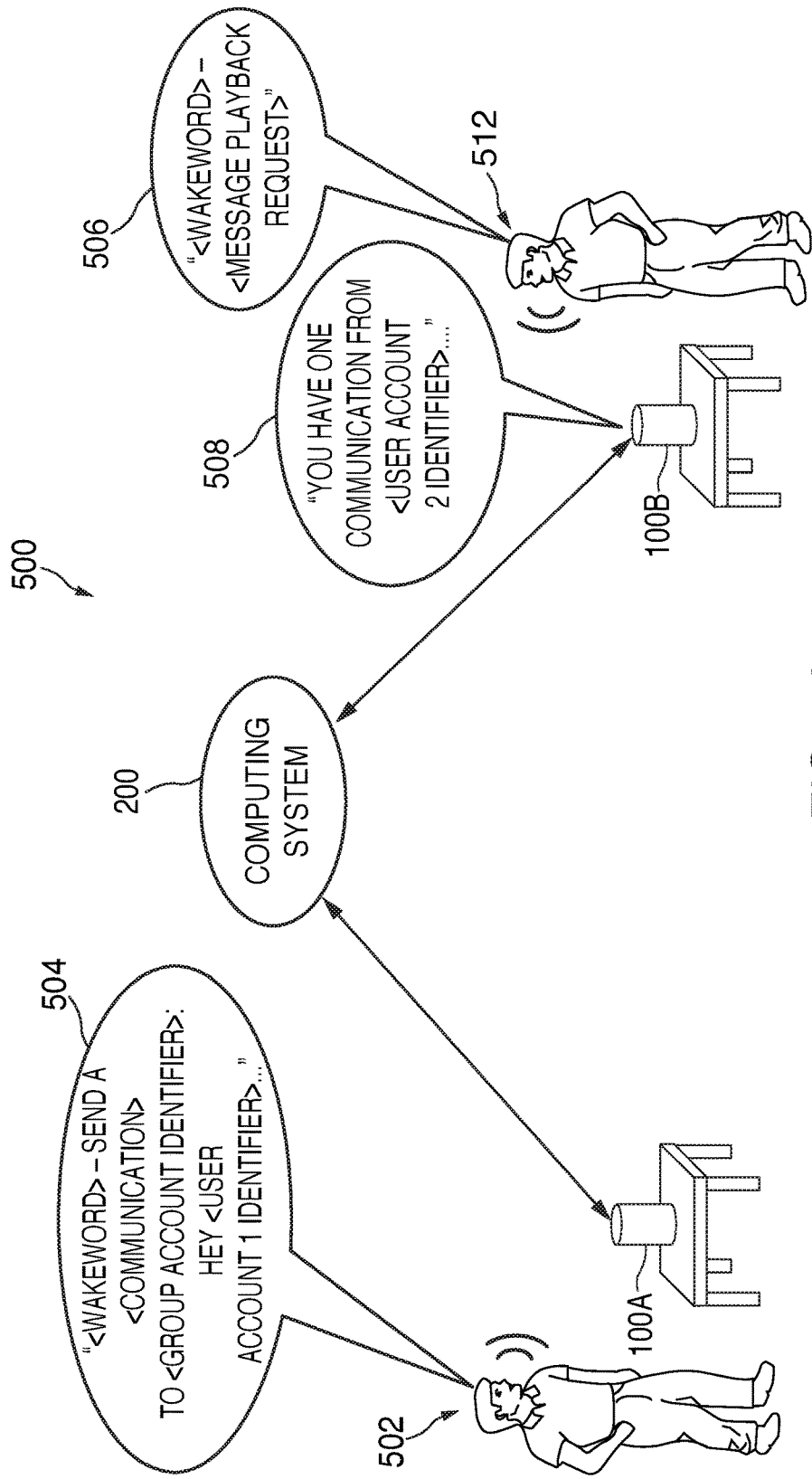
FIG. 5A is an illustrative diagram of an exemplary system for causing a message initially directed to a first recipient to be redirected to a second recipient based on contextual information associated with the message, in accordance with various embodiments.

FIG. 5A is an illustrative diagram of an exemplary system for causing a message initially directed to a first recipient to be redirected to a second recipient based on contextual information associated with the message, in accordance with various embodiments. System 500, in a non-limiting embodiment, includes an individual 502, who may speak an utterance 504 to their first shared voice activated electronic device 100a, which may be substantially similar to voice activated electronic device 100, and the previous description may apply. In one embodiment, utterance 504 may include a first portion corresponding to a wakeword, a second portion corresponding to a command to send a message, a third portion corresponding to a recipient's group account (e.g., a messaging account associated with a particular recipient), and a fourth portion corresponding to message payload (e.g., a message to be sent the recipient). For instance, utterance 504 may include an invocation to send a communication to a particular recipient, as well as the communication. For example, utterance 504 may be, "<Wakeword>—Send a <Communication Type> to <Group Account Identifier>: Hey <User Account Identifier> . . . " For example, the utterance may correspond to "Alexa—Send a Message to the Smiths. Hey Mike . . . " In this particular scenario, the variables <Wakeword>, <Communication Type>, <Group Account Identifier>, and <User Account Identifier> may correspond to "Alexa," "message," "the Smiths," and "Mike," respectively.

In response to detecting a wakeword or other trigger, electronic device 100a may begin packaging and sending audio data representing utterance 504 to speech-processing system 250 of computing system 200. In some embodiments, speech-processing system 250 may generate text data representing the audio data by performing speech-to-text processing to the audio data. For instance, using STT system 266 of ASR system 258, text data of utterance 504 may be generated. Using natural language understanding processing (e.g., NLU system 260) it may be determined that utterance 504 has a first intent corresponding to sending a message to a particular recipient, as well as including the message to be sent. For example, the message may be, "Hey <User Account Identifier> . . . ," and a recipient may be <Group Account Identifier>. Speech-processing system 200 may, therefore, send the message to the particular recipient identified using NLU system 260. For example, the message may then be sent to message database 274 so that message database 274 may store the message for the group account identifier that was determined.

In some embodiments, NLU system 260 may determine, using the text data corresponding to the fourth portion of the utterance, that the message includes the <User Account Identifier> and therefore is intended to be directed to a messaging account different from the messaging account indicated from the third portion of the utterance. This information may be provided this contextual recognizer system 270, which may determine that the messaging account indicated within the fourth portion differs from the messaging account indicated within the third portion. For instance, contextual recognizer system 270 may determine that the recipient group account for utterance 504 may correspond to <Group Account Identifier>, however the recipient may be <User Account 1 Identifier>. Contextual recognizer system 270 may, therefore, determine the messaging account associated with <User Account 1 Identifier> (e.g., a user account associated with that identifier), such that the fourth portion of the utterance may be sent to that messaging account. In some embodiments, communications system 220 may further be able to determine that the messaging account associated with the recipient group account (e.g., <Group Account Identifier>) is associated with the messaging account identified from the fourth portion (e.g., <User Account 1 Identifier>).

In another embodiment, speech-processing system 250 and communications system 220 may determine whether an intended recipient of a communication determined by NLU system 260 is the same as an intended recipient of the communication that was determined by contextual recognizer system 270. If not, then speech-processing system 200 may determine which of the two intended recipients the message is to be sent to. In some embodiments, if NLU system 260 determines that the communication should be sent to a first recipient, but contextual recognizer system 270 determines that the communication should be sent to a second recipient, then the message to be sent to the first recipient. Alternatively, in some embodiments, if NLU system 260 determines that the communication should be sent to a first recipient, but contextual recognizer system 270 determines that the communication should be sent to a second recipient, then the message may be sent to the second recipient. In the latter scenario, contextual recognizer system 270 may have the recipient that was determined be ranked greater than that of NLU system 260.

In this particular scenario, where the identified recipient from contextual recognizer system 270 is ranked greater than the identified recipient from NLU system 260, communications system 220 may cause the message to be stored by message database 274 for the user/group account associated with the second recipient. For example, the first recipient identified by NLU system 260 for utterance 504 may be the group account corresponding to the group account identifier: <Group Account Identifier>. The second recipient identified for utterance 504 may be the user account corresponding to the user account identifier: <User Account Identifier>. In this particular scenario, communications system 220 may cause the message, "Hey <User Account Identifier>, . . . ," to be stored by message database 274 for the user account corresponding to <User Account Identifier>. In this way when the second recipient requests to receive their messages, the message from utterance 504 may be provided.

In the illustrative embodiment, a second individual 512 may speak a second utterance 506 to their shared voice activated electronic device 100b. Voice activated electronic device 100 may, for instance, be substantially similar to voice activated electronic device 100, and the previous description may apply. In response to determining that a wakeword for voice activated electronic device 100b was uttered (e.g., "<Wakeword>"), audio data representing utterance 506 may be sent to speech-processing system 200. Upon receipt, speech-processing system 200 may generate text data representing the audio data using ASR system 258, and may determine an intent of utterance 506 by performing natural language understanding processing to the text data. In some embodiments, the text data may be compared to one or more sample utterance, and if a match is found, then an intent, and the relevant variables, may be extracted from the text data. For example, text data representing utterance 506 may substantially match a same utterance for causing messages received to be output by electronic device 100b. For instance, utterance 506 may correspond to "<Wakeword>—<Message Playback Request>," where <Wakeword> may correspond to a wakeword or trigger for electronic device 100b (e.g., "Alexa"), and <Message Playback Request>" may correspond to a message playback sample utterance (e.g., "Play my messages").

In some embodiments, an identifier, such as a device identifier, for electronic device 100b may be sent to speech-processing system 200 in addition to audio data representing utterance 506. Using the identifier, a group account associated with electronic device 100b may be determined. Furthermore, in some embodiments, speaker identification processing may be performed to the audio data representing utterance 506 to determine a speaker of utterance 506. For instance, speaker identification system 276 may perform speaker identification processing to the audio data to determine whether a speaker identifier (e.g., a vector representing acoustic features associated with audio data representing utterance 506) of the speaker (e.g., individual 512) corresponds to voice biometric data of a user account associated with the identified group account. If the speaker identifier is determined to match a particular user account (e.g., confidence score is greater than a confidence score threshold), then it may be determined that the speaker of utterance 506 (e.g., individual 512) corresponds to the user account identifier of that voice biometric data's user account.

In the illustrative embodiment, message database 274 may store the received message for the second recipient with that recipients user account (if the second recipient corresponds to a user account). Upon receiving the request for message playback, speech-processing system 200 may access the message, and may generated a summary response indicating a number of messages that have been received, as well as who the message(s) were received from, and the message(s), to electronic device 100b. As an illustrative example, response 508 may be generated, "<User Account Identifier>, you have one communication from <Sender Identifier>: Hey <User Account Identifier>, . . . " In this way, the communication, which was initially to be sent to a first recipient (e.g., a group account corresponding to group account identifier <Group Account Identifier>) to now be sent instead to a second recipient (e.g., a user account corresponding to user account identifier <User Account Identifier>). In this way, speech-processing system 200 is capable of redirected messages based on the content of the actual message, to improve an overall user experience by appropriately providing the correct recipient with the sent message.

FIG. 5B is an illustrative diagram of another exemplary system for redirecting a reply message from being directed to a first recipient to being directed to a second recipient, in accordance with various embodiments. System 550, in a non-limiting embodiment, may be substantially similar to system 500 of FIG. 5A, with the exception that system 500 corresponds to an exemplary scenario where a first messaging account is replying to a message received from a second messaging account, and the message is redirected to a third messaging account. In system 550, electronic device 100A may indicate that one or more messages have been received either for a group account associated with electronic device 100A, or by a user account associated with the group account. For example, in response to requesting messages to be played, electronic device 100A may output a response 554, "You have one message from <Group Account Identifier>." In some embodiments, the message may be sent from another group account, but the message may have been spoken by a particular individual having a user account associated with the group account. For example, individual 512 may have spoken the message, but speaker identification processing may not have been able to identify individual 512 as being a speaker, and therefore the message may have been sent from a group account associated with electronic device 100B.

In response to receiving the message, individual 502 may speak utterance 556 to reply to the message—"<Wakeword>—Reply: 'Hey <User Account 1 Identifier>' . . . " In this particular scenario, the utterance may include a first portion corresponding to the wakeword (e.g., <Wakeword>), a second portion corresponding to a send message command (e.g., "reply"), and a third portion including message payload (e.g., "Hey <User Account 1 Identifier>"). Another portion, although not included explicitly, may indicate a recipient account (e.g., <Group Account Identifier>), which may be determined based on individual 502 responding to the received message.

In some embodiments, computing system 200 may determine that the message is directed to a different messaging account associated with the identifier <User Account 1 Identifier> than the group account <Group Account Identifier> that the message was sent from. In this particular scenario, communications system 220 of computing system 200 my determine that a different user account corresponding to <User Account 1 Identifier> is the intended recipient of the reply message, as opposed to the group account with which the message was received from. In this particular scenario, the message may be stored within message database 274 for the user account associated with the identifier <User Account 1 Identifier>. Thus, when individual 512 speaks utterance 558 requesting that his/her messages be played, response 560 may be output, "Hey <User Account 1 Identifier> . . . " If a speaker identifier associated with individual 512 was unable to be identified, then response 560 may indicate a number of messages excluding the message "Hey <User Account 1 Identifier> . . . " that have been received.

Figure 6:
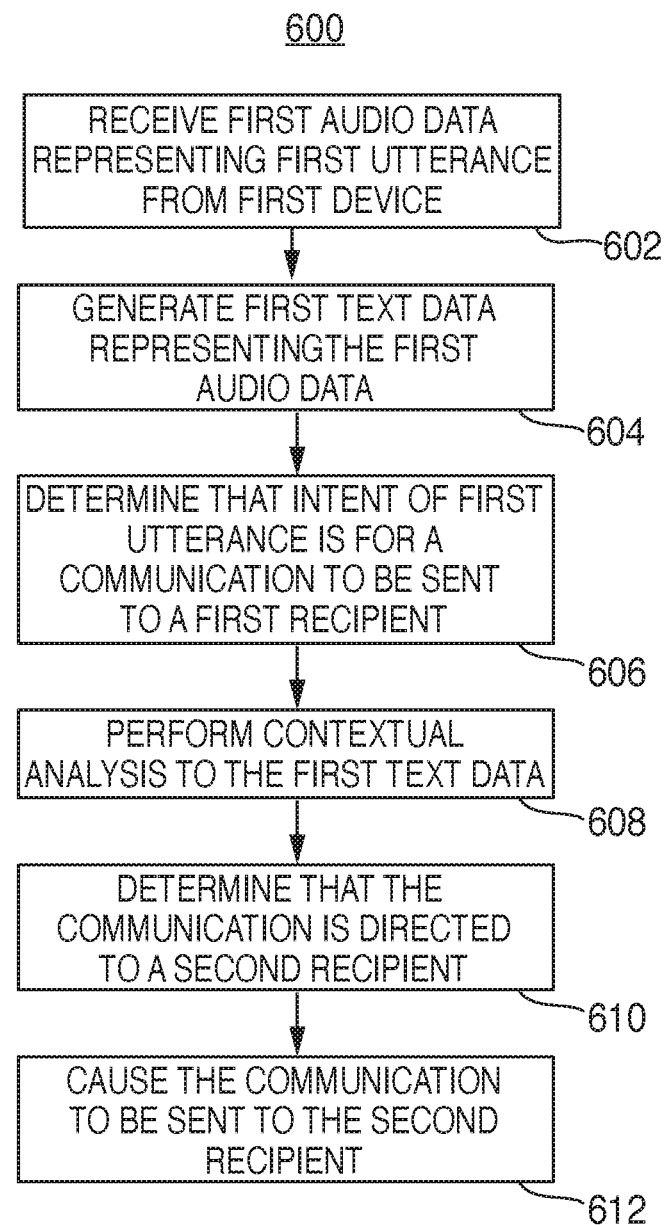
FIG. 6 is an illustrative flowchart of an exemplary process for causing a message to be redirected based on contextual information associated with the message, in accordance with various embodiments.

FIG. 6 is an illustrative flowchart of an exemplary process for causing a message to be redirected based on contextual information associated with the message, in accordance with various embodiments. Process 600, in the non-limiting embodiment, may begin at step 602. At step 602, first audio data representing a first utterance may be received from a first device. For example, speech-processing system 200 may receive first audio data representing utterance 504 from voice activated electronic device 100a. In this particular scenario, utterance 504 may include a first portion corresponding to a wakeword, a second portion corresponding to a command to send a message, a third portion corresponding to a recipient messaging account, and a fourth portion including a message payload (e.g., "Hey <User Account Identifier>, . . . "). In some embodiments, the first device may begin sending the first audio data representing the first utterance to the speech-processing system in response to determining that the first portion corresponds to the wakeword (e.g., "Alexa"). In other embodiments, the first portion including the wakeword may be omitted. For example, a similar action may occur in response to a manual input being detected. The first device may then send audio data representing the utterance (e.g., utterance 504) to a speech-processing system (e.g., speech-processing system 250).

At step 604, first text data representing the first audio data may be generated. For instance, ASR system 258 may be provided with the first audio data in response to being received by speech-processing system 200. Using STT system 266, first text data representing the first audio data may be generated. In some embodiments, the first text data may represent the second portion, the third portion and the fourth portion, as the first portion corresponding to the wakeword may be omitted. At step 606, the first text data may be provided to NLU system 260, which may determine, using the first text data, that an intent of the first utterance is for a communication to be sent to a first recipient. For instance, NLU system 260 may determine that the first text data substantially corresponds to a sample utterance's framework for sending communications to a recipient. As an illustrative example, the sample utterance may be, "<Wakeword>—Send a <Communication Type> to <Recipient Identifier>: '<Message>'." Using this framework, NLU system 260 may determine that utterance 504, for example, may be a request to send a communication of the type <Communication Type> (e.g., a message) to a particular recipient corresponding to <Group Account Identifier>, where the communication to be sent <Message> corresponds to, "Hey <User Account Identifier>, . . . " In some embodiments, NLU system 260 may further determine that the communication, or the fourth portion of the utterance, indicates a second messaging account with which the communication is to be sent, where the second communication differs from the first communication identified from the third portion.

At step 608, contextual analysis may be performed to the first text data. In some embodiments, the first text data may be provided to contextual recognizer system 270. Contextual recognizer system 270 may analyze the first text data to determine whether any of the words of the first utterance indicate that the particular communication is to be sent to a particular recipient. In some embodiments, contextual recognizer system 270 may use keyword spotting technology to determine whether the first text data includes one or more keywords or key phrases. For instance, contextual recognizer system 270 may determine that the first text data includes the phrase, "Hey <User Account Identifier>," indicating that an intended recipient of the communication to be sent is for a recipient corresponding to <User Account Identifier>. Contextual recognizer system 270 may also analyze the first text data to determine whether or not a particular communication is of higher priority (e.g., if it includes the words "urgent" or "important"), or particular temporal information included within the communication. Persons of ordinary skill in the art will recognize that contextual recognizer system 270 may be used to analyze the first text data for any type of keyword or phrase, and the aforementioned is merely exemplary.

At step 610, contextual recognizer system 270 may determine that the fourth portion of the utterance indicates that the communication is to be sent to a second recipient, corresponding to a second messaging account, that differs from the first recipient corresponding to the first messaging account. As an illustrative example, contextual recognizer system 270 may determine that a recipient of the message of utterance 504 should be <User Account Identifier>, as opposed to <Group Account Identifier>.

At step 612, speech-processing system 200 may cause the communication to be sent to the second recipient's messaging account. In some embodiments, communications system 220 may cause the communication to be stored by message database 274 for the user account associated with <User Account Identifier>. In this particular scenario, the communication may be received by the second recipient in response to the second recipient requesting that their communications be output by their corresponding device. For example, in response to receiving audio data representing utterance 506, communications system 220 may determine text data representing a response, and speech-processioning system 250 may generate and send audio data representing the text data, as well as the communication received for the second recipient, to electronic device 100B In some embodiments, the second recipient may respond to the first communication using their device. In this instance, the second recipient may send a second communication to the first recipient based on whether the first recipient corresponds to a group account or a user account. For example, if speaker identification processing was able to identify a speaker of utterance 504 (e.g., individual 502), then when individual 512 responds to the first communication, the second communication may be sent to the user account associated with the identified speaker. Alternatively, if speaker identification processing was not able to identify a speaker of utterance 504, or if speaker identification processing was not available, then the first communication may have been sent from a group account associated with electronic device 100A. In this particular scenario, the second communication may be sent to the first recipient's group account. However, in some embodiments, contextual recognizer system 270 may further analyze the second communication, and may determine an intended recipient of the second communication such that the second communication may be sent to the recipient identified by contextual recognizer system 270.

Figure 7:
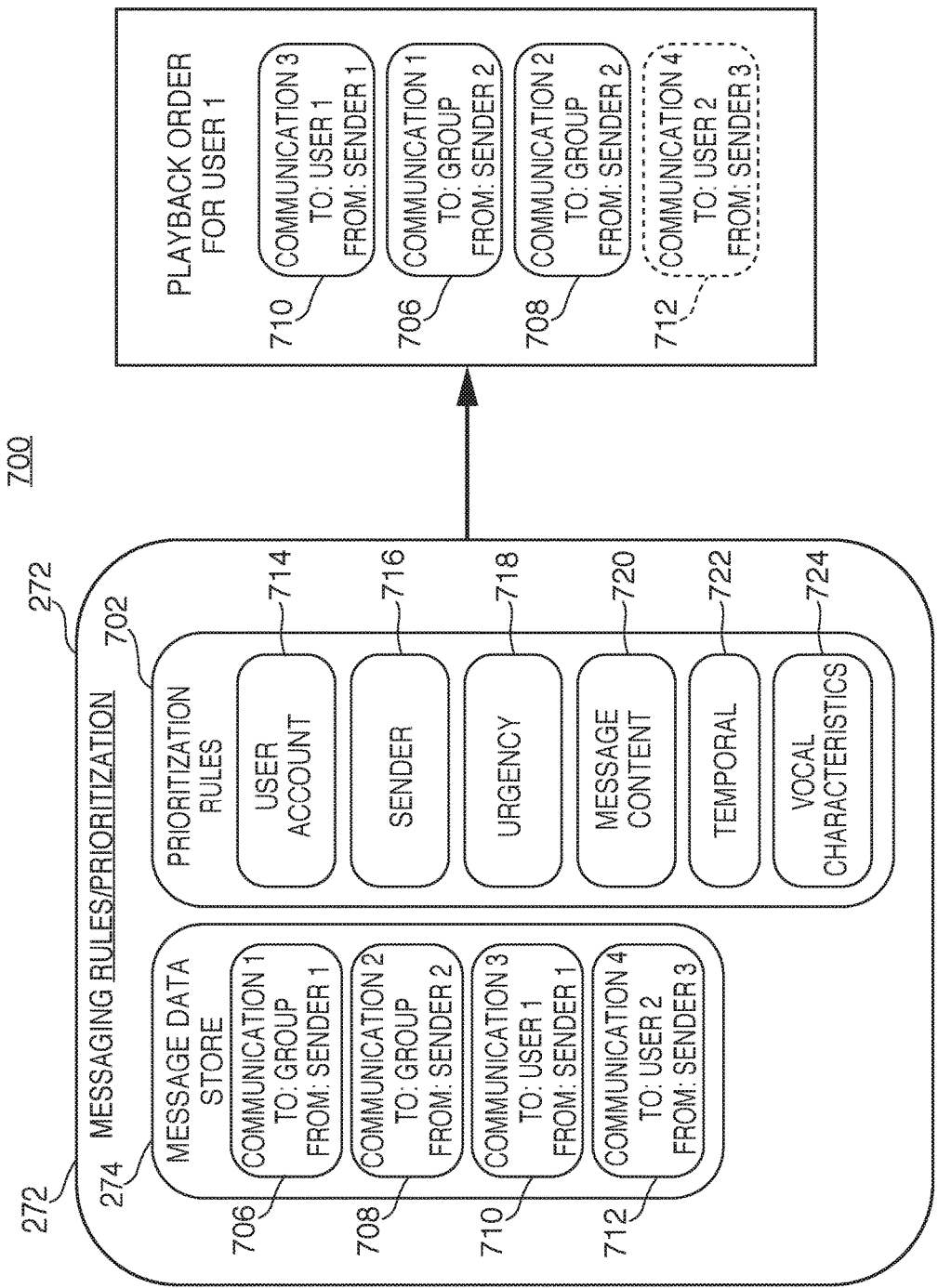
FIG. 7 is an illustrative diagram of an exemplary system for prioritizing messages for playback based on one or more prioritization rules, in accordance with various embodiments.

FIG. 7 is an illustrative diagram of an exemplary system for prioritizing messages for playback based on one or more prioritization rules, in accordance with various embodiments. System 700, in the illustrative embodiment, may include messaging rules/prioritization system 272. As mentioned previously, messaging rules/prioritization system 272 may include message database 274. In one embodiment, messaging rules/prioritization system 272 may also include prioritization rules 702, which may correspond to one or more rules for prioritizing received communications for a particular user account and/or group account when playback of communications have been requested.

In some embodiments, message database 274 may store one or more communications, such as messages and/or missed calls, that have been received for a particular user account and/or group account. For example, an individual may have their own user account on speech-processing system 200, and may be able to receive messages sent by other user accounts and/or group accounts to that individual's user account. User accounts may also be associated with group accounts, where each group account may be associated with a shared electronic device (e.g., voice activated electronic device 100). A group account, for instance, may be associated with one or more user accounts corresponding to the various individuals that may typically interact with a shared electronic device. Therefore, in response to receiving a request to output communications, speech-processing system 200 may determine a user account associated with the request and/or a group account associated with the request. In some embodiments, speech-processing system 200 may perform speaker identification processing to the request in order to determine a speaker of the request, and therefore a user account of the speaker. If the speaker is able to be identified, then the user account associated with that speaker may be determine. In some embodiments, the group account may be determined using a device identifier associated with the device that the request was received from.

Message database 274, in the illustrative embodiment, may include a first communication 706, a second communication 708, a third communication 710, and a fourth communication 712. First communication 706 may have been sent to a group account (e.g., "GROUP"), and may have been received from a first sender (e.g., "SENDER 1"). Second communication 708 may have been sent to the group account, but may have been received from a second sender (e.g., "SENDER 2"). Third communication 710 may have been sent to a first user account (e.g., "USER 1"), and may have been received from the first sender, and fourth communication 712 may have been sent to a second user account (e.g., "USER 2"), and may have been received from a third sender (e.g., "SENDER 3"). In one embodiment, the first user account (e.g., "USER 1") and the second user account (e.g., "USER 2") may both be associated with a same group account (e.g., "GROUP"). For example, the group account may be assigned to voice activated electronic device 100, and the first user account and the second user account may correspond to two different individual's user accounts, where both of the individuals are members of that group account, and therefore also may be associated with voice activated electronic device 100.

Prioritization rules 702 may include one or more rules, parameters, and/or inputs with which communications may be ordered for playback when requested for an individual using their voice activated electronic device 100. In some embodiments, because some voice activated electronic devices 100 do not include display screen 212, prioritizing communications for playback in such a manner that communications that a recipient is more likely to want to consume first are provided to the recipient first may enhance the recipient's over user experience with their voice activated electronic device. For instance, outputting unimportant messages prior to important messages may detract from an individual's user experience, as they may have to wait to hear the important messages instead of being able to hear them first. If display screen 212 were included, for example, and the messages and senders of those messages were able to be visualized, a recipient would be able to pick and choose which messages to consume first. Therefore, providing a voice user interface that pre-filters and pre-orders messages to be consumed so that the messages that an individual would likely desire to consume first are, in fact, output first, may be particularly beneficial to the individual. In some embodiments, prioritization rules 702 may include, but are not limited to, user account rules 714, sender rules 716, urgency rules 718, message content rules 720, temporal rules 722, and vocal characteristics rules 724. However, persons of ordinary skill in the art will recognize that any additional rules may also be employed, and one or more of the aforementioned rules may be removed.

User account rules 714 may, in one embodiment, correspond to a rule that applies greater weight to messages received for a user account of a particular speaker than that of messages received for a group account and/or messages received for other user accounts not associated with the speaker. For instance, in response to performing speaker identification processing to audio data representing a request for message playback, user account rules 714 may cause messages received for an identified speaker's user account to be weighted for playback greater than messages not received for the identified speaker's user account. As an illustrative example, messages received for a user account of individual 2 of FIG. 1 may be weighted greater than messages received for a group account of voice activated electronic device 100, as well as any other user accounts also associated with the group account.

Sender rules 716, in one embodiment, may correspond to one or more rules that cause certain communications sent by specified senders to be weighted greater than other messages. For example, an individual may specify certain user accounts and/or group accounts as being higher priority senders than other individuals. If messages are received from these user accounts and/or group accounts, then those messages may be prioritized for playback as opposed to messages received for other user accounts and/or group accounts.

Urgency rules 718 may, in one embodiment, correspond to one or more rules that cause certain communications that are indicated by a sender of that communication as being urgent or important to be weighted greater than other communications. For example, when an individual sends a message to a recipient, the individual may indicate to speech-processing system that the message is an urgent message. For instance, the individual may say, "<Wakeword>, send an urgent message to <User Account Identifier>: <Message>." This may cause speech-processing system 200 to classify the message <Message> as being an urgent message, and therefore messaging rules/prioritization system 272 may weight that message higher than other messages that have not been indicated as being urgent. In some embodiments, contextual recognizer system 270 may analyze text data representing a message to determine whether or not that message is urgent, or more generally, an importance of the message. For example, contextual recognizer system 270 may determine whether the word "urgent" or "important" are included within the spoken utterance including the message. If so, then urgency rules 718 may indicate that the message is to be indicated as being urgent, even though the sender may not have indicated this when speaking the utterance.

Message content rules 720 may, in one embodiment, correspond to one or more rules that cause certain messages to be weighted greater than other messages based on the contextual information determined to be included within that message. For instance, contextual recognizer 270 may analyze text data representing an utterance to determine whether the utterance included any keywords or key phrases that may indicate that a particular message is directed to a different recipient than a recipient identified by NLU system 260, and/or if the utterance includes any indication of an urgency of the message. For example, as mentioned previously, contextual recognizer system 270 may determine that a message includes the words "urgent" and/or "important," and therefore may indicate that the message is to be indicated as being urgent and should be weighted greater than other messages that were not indicated as being urgent.

Temporal rules may, in one embodiment, correspond to rules associated with temporal aspects of the communications that are stored by message database 274, as well as a request received for the message playback. For example, temporal rules 722 may cause an amount of time between when a request to have messages played is received, and when a particular communication was received, to be determined. If the amount of time is less than a particular threshold amount of time, and/or greater than another threshold amount of time, then this may cause certain rules to be applied to how a response to the message playback request is determined (e.g., as described in greater detail by Table 8).

Vocal characteristic rules 724 may, in one embodiment, correspond to rules associated with various features associated with an inflection, volume, or any other characteristic associated with the way a particular message. For example, the vocal characteristics for a message may indicate that the message was spoken in a particular manner indicating urgency, and therefore the message may be flagged as being urgent. Persons of ordinary skill in the art will recognize that any suitable vocal characteristic may be analyzed to determine a way in which a corresponding message is to be organized, and the aforementioned is merely exemplary.

In some embodiments, messaging rules/prioritization system 272 may apply prioritization rules 702—user account rules 714, sender rules 716, urgency rules 718, message content rules 720, temporal rules 722, and vocal characteristic rules 724—to the communications received by message database 274 for a particular user account. For example, in response to receiving a request to playback messages, speech-processing system 200 may determine a speaker identifier associated with the request. Speech-processing system 200 may determine that the speaker identifier is associated with a first user account (e.g., "USER 1"), and may also determine that the speaker identifier, and/or a device identifier of a requesting device (e.g., voice activated electronic device 100) is associated with a group account (e.g., "GROUP"). Thus, communications 706, 708, 710, and 712, may all correspond to either the first user account, the group account, and/or a second user account also associated with the speaker's group account.

In response to applying prioritization rules 702, playback order for the first user account 704 may be generated. In one embodiment, the playback order for communications 706, 708, 710, and 712 may be that third communication 710 is output first, first communication 706 is output second, and second communication 708 is output third. Fourth communication 712, which may be associated with the second user account, may optionally be output fourth, as this communication is associated with a user account differing from the identified speaker's user account (e.g., first user account "USER 1"). In the illustrative embodiment, communications 706, 708, 710, and 712 are organized for playback such that the communications received for the first user account received a greatest weighting, such that these communications are output first. For instance, third communication 710, which is directed to the first user account, is output first using message playback order 704. First communication 706 and second communication 708 may, in the illustrative embodiment, be output next, where first communication 706 is output prior to second communication 708. For instance, the first sender (e.g., "SENDER 1") may correspond to a high priority sender, and therefore first communication 706 may be assigned a greater weighting than second communication 708, received from the second sender (e.g., "SENDER 2"), even though both first communication 706 and second communication 708 are both directed to the group account (e.g., "GROUP").

In some embodiments, fourth communication 712 may be organized for playback after first communication 706, second communication 708, and third communication 710, as fourth communication 712 is directed to a second user account (e.g., "USER 2"), which may differ from a user account of the identified speaker (e.g., "USER 1"). Therefore, after communications 706-710 are provided, an option may be provided for an individual to receive fourth communication 712. However, persons of ordinary skill in the art will recognize that messages received for other user accounts differing from the user account of the requesting speaker may, in some embodiments, not be available for playback, and the aforementioned is merely exemplary.

In some embodiments, if a particular communication is flagged as being an urgent message, then that message may be ranked higher than some non-urgent messages. For example, first communication 706 may be an urgent communication. Therefore, in this particular scenario, first communication 706 may be arranged such that message playback order 704 includes first communication 706 configured to be output first, followed by third communication 710 and second communication 708, respectively. However, persons of ordinary skill in the art will recognize that any suitable ordering or ranking scheme may be employed by speech-processing system 200, and/or by an individual associated with a group account and/or a user account on speech-processing system 200, and the aforementioned is merely exemplary.

Figure 8:
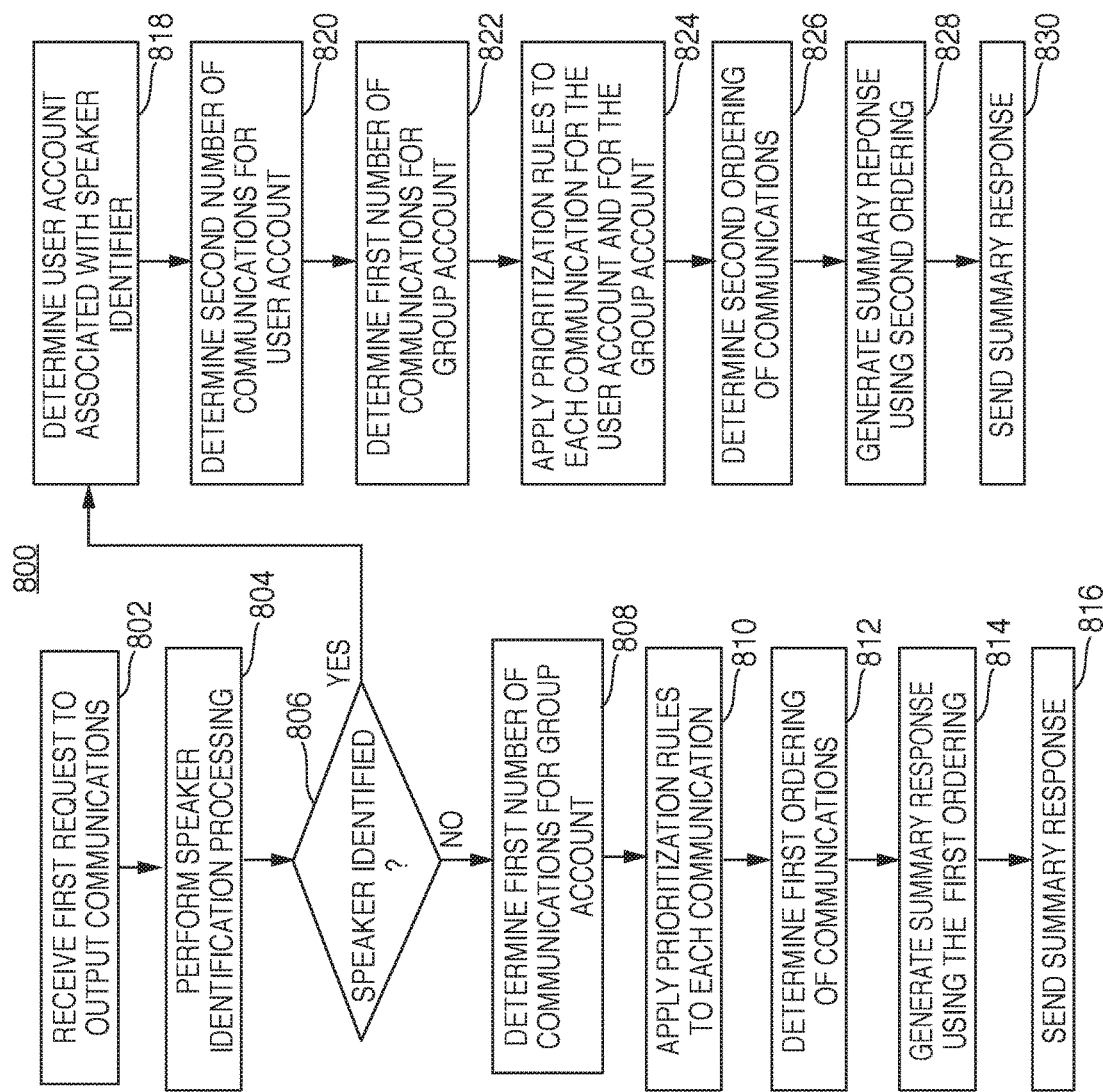
FIG. 8 is an illustrative flowchart of an exemplary process for prioritizing messages using one or more prioritization rules, in accordance with various embodiments.

FIG. 8 is an illustrative flowchart of an exemplary process for prioritizing messages using one or more prioritization rules, in accordance with various embodiments. Process 800, in a non-limiting embodiment, may begin at step 802. At step 802, a first request output communication may be received. For example, audio data representing an utterance, "Alexa, play my messages," may be received by speech-processing system 200 from voice activated electronic device 100. In some embodiments, upon receipt of the audio data, the audio data may be provided to ASR system 258, which may generate text data representing the audio data. NLU system 260 may then receive the text data, and may determine that an intent of the utterance is a request for communications received for a particular user account and/or a group account to be output.

At step 804, speaker identification processing may be performed to determine a speaker of the first request. For example, speaker identification system 276 may generate a speaker identifier for first audio data representing the utterance requesting message playback. The speaker identification processing may attempt to resolve, for instance, a user account and/or group account with which the request corresponds to. For example, speaker identification processing may attempt to determine whether the word "my" in the utterance, "play my messages," corresponds to a particular user account, or if it corresponds to a group account associated with the requesting device (e.g., voice activated electronic device 100). The generated speaker identified may be compared to voice biometric data stored for a group account associated with the requesting device, which may include speaker identifiers for each associated user account of the group account. At step 806, a determination may be made as to whether the speaker has been able to be identified. For instance, a determination as to whether the generated speaker identifier substantially matches (e.g., a confidence score exceeds a threshold confidence score) voice biometric information associated with a user account of the requesting device's corresponding group account.

If, at step 806, a speaker of the first request is not able to identified, or if speaker identification processing is otherwise unavailable, then process 800 may proceed to step 808. At step 808, a first number of communications received for a group account may be determined. In some embodiments, the group account associated with the first request may be determined based on a device identifier received with first audio data representing the spoken first request, where the device identifier is associated with a device that the first audio data was received from. For example, the device identifier may indicate that voice activated electronic device 100 sent audio data representing an utterance of the first request to speech-processing system 250. Using the device identifier, a group account of communications accounts system 278, may be determined that is assigned to the corresponding device. In some embodiments, message database 274 may store communications that have been received for that group account. For example, communications (e.g., messages and/or missed calls) for the identified group account may be stored by message database 274, and a number of communications received for that group account may be determined.

At step 810, one or more prioritization rules may be applied to each communication received for the group account. For example, prioritization rules 702 may be applied to the communications received for the group account. In one embodiment, the prioritization rules may include, but are not limited to, prioritizing messages based on sender information (e.g., same senders, high priority senders), recipient information, urgency information, contextual information, and the like. At step 812, a first ordering of the communications may be determined based on the prioritization rules that were applied. For example, the prioritization rules may cause certain messages to be ranked higher than other messages, and therefore the ordering of the messages based on the ranking may be determined.

At step 814, text data representing a summary response may be generated using the first ordering of communications. For example, the summary response techniques of Tables 1-8 may be employed to determine a summary response format to use. After selecting an appropriate summary response format, the appropriate information (e.g., number of communications, sender information, temporal information, etc.) may be inserted, and the summary response may be generated. For instance, audio data representing the text data may be generated using TTS system 264. At step 816, the summary response (e.g., the audio data) may be sent to the requesting device (e.g., voice activated electronic device 100). In this way, the summary response may be output prior to the received communications for the group account such that the recipient is able to hear what communications are available for consumption.

If, at step 806, the speaker was able to be identified, then process 800 may proceed to step 818. At step 818, a user account associated with a speaker identifier obtained from the speaker identification processing may be determined. For example, the speaker identifier may correspond to a first user account's voice biometric data, therefore indicating that the speaker of the first request was likely a first individual associated with the first user account. At step 820, a second number of communications that were received for the user account of the identified speaker may be determined. For instance, similarly to how the first number of communications are determined for the group account, communications (e.g., messages and/or missed calls) received for the user account may be stored by message database 274. At step 822, the first number of communications received for the group account may be determined. Step 822 and step 808, in one embodiment, may be substantially similar to one another, and the previous description may apply.

At step 824, prioritization rules may be applied to each communication received for the user account, as well as for the group account. For example, prioritization rules 702 may be applied to communications 706-712 stored by message database 274. In some embodiments, prioritization rules 702 may rank the received communications such that communications received for the user account are prioritized over communications received for the group account. At step 826, a second ordering of the communications may be determined based on the prioritization rules applied previously. For example, communications 706-712 may be ordered, as seen by playback order 704, such that communication 710 is configured to be output first, followed by first communication 706, and second communication 708, respectively. At step 828, a summary response may generated using the second ordering of the communications, and the summary response, as well as the communications, may be sent to the requesting device (e.g., voice activated electronic device 100) at step 830. In some embodiments, steps 828 and 830 may be substantially similar to steps 814 and 816, with the exception that at steps 828 and 830, the summary response is generated based on the second ordering of the communications received for the group account and the user account.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:
1. A method, comprising:
receiving, from an electronic device, first audio data representing speech;
receiving a device identifier associated with the electronic device;
determining a group account associated with the device identifier;
performing speech-to-text processing on the first audio data to generate text data;
determining, using the text data, that an intent of the speech is for messages to be output by the electronic device;

generating acoustic features representing the first audio data;
determining that the acoustic features correspond to stored acoustic features associated with a user account;
determining that a message database includes first message data associated with the user account;
determining that the message database includes second message data associated with the group account;
determining that the first message data is to be output by the electronic device prior to the second message data based, at least in part, on the first message data being associated with the user account;
generating second audio data representing the first message data and the second message data, the second audio data configured to have the first message data output prior to the second message data; and
sending the second audio data to the electronic device.

2. The method of claim 1, further comprising:
determining that the message database includes third message data associated with the user account;
determining first sender information associated with the first message data;
determining second sender information associated with the third message data; and
determining the third message data is to be output by the electronic device prior to the first message data based, at least in part, on the second sender information corresponding to a prioritized contact,
wherein the second audio data is configured to have the third message data output prior to the first message data and the first message data output prior to the second message data.

3. The method of claim 1, further comprising:
determining that the message database includes third message data associated with the group account;
determining that the third message data is indicated as being urgent; and
determining that the third message data is to be output by the electronic device prior to the first message data based, at least in part, on the third message data being indicated as urgent,
wherein the second audio data is configured to have the third message data output prior to the first message data and the first message data output prior to the second message data.

4. The method of claim 1, further comprising:
determining that the message database includes third message data associated with the user account;
determining the message database includes fourth message data associated with the user account;
determining that the third message data was received within a threshold amount of time of the fourth message data; and
determining that the third message data and the fourth message data are each to be output by the electronic device prior to the first message data based, at least in part, on the third message data being received within the threshold amount of time of the fourth message data,
wherein the second audio data is configured to have the third message data and the fourth message data output prior to the first message data and the first message data output prior to the second message data.

5. A method, comprising:
receiving, from a device, a request for communications to be output;
determining a device identifier associated with the device;
determining a group account associated with the device identifier;
determining that first communication data was received for the group account;
determining a user identifier associated with the request, the user identifier being associated with a user account associated with the group account;
determining that second communication data was received for the user account; and
causing, based at least in part on the user identifier being associated with the request, the second communication data to be output by the device prior to the first communication data.

6. The method of claim 5, further comprising:
generating first audio data representing the second communication data;
generating second audio data representing the first communication data;
sending the first audio data to the device; and
sending the second audio data to the device.

7. The method of claim 5, further comprising:
determining that third communication data was received for the user account;
determining the second communication data is associated with first sender information;
determining the third communication data is associated with the first sender information; and
grouping the second communication data and the third communication data.

8. The method of claim 5, further comprising:
determining that third communication data was received for the user account;
determining the second communication data corresponds to high priority communication data; and
determining that the second communication data is to be output prior to at least the third communication data.

9. The method of claim 8, further comprising:
determining the second communication data corresponds to high priority communication data using keyword spotting.

10. The method of claim 5, further comprising:
determining that third communication data was received for the user account;
determining the second communication data is associated with first sender information;
determining the third communication data is associated with second sender information, the second sender information being different from the first sender information;
determining the second sender information corresponds to prioritized sender information; and
determining that the third communication data is to be output prior to the second communication data and the first communication data.

11. The method of claim 5, further comprising:
determining that third communication data was received for the group account;
determining the first communication data is associated with first sender information;
determining the third communication data is associated with second sender information, the second sender information being different from the first sender information;
determining the second sender information corresponds to prioritized sender information; and determining that the third communication data is to be output prior to the second communication data and the first communication data.

12. The method of claim 5, further comprising:
determining that third communication data was received for the user account;
determining fourth communication data was received for the user account;
determining that the fourth communication data was received after the second communication data;
determining the fourth communication data was received after the third communication data;
determining the second communication data was received within a threshold amount of time of the third communication data; and
causing the second communication data and the third communication data to be output prior to the fourth communication data and the first communication data.

13. A computing system, comprising:
at least one processor; and
at least one memory comprising instructions that, when executed by the at least one processor, cause the computing system to:
receive, from a device, a request for communications to be output;
determine a device identifier associated with the device;
determine a group account associated with the device identifier;
determine that first communication data was received for the group account;
determine a user identifier associated with the request, the user identifier being associated with a user account associated with the group account;
determine that second communication data was received for the user account; and
cause, based at least in part on the user identifier being associated with the request, the second communication data to be output by the device prior to the first communication data.

14. The computing system of claim 13, wherein the at least one memory further comprises instructions that, when executed by the at least one processor, further cause the computing system to:
generate first audio data representing the second communication data;
generate second audio data representing the first communication data;
send the first audio data to the device; and
send the second audio data to the device.

15. The computing system of claim 13, wherein the at least one memory further comprises instructions that, when executed by the at least one processor, further cause the computing system to:
determine that third communication data was received for the user account;
determine the second communication data is associated with first sender information;
determine the third communication data is associated with the first sender information; and
group the second communication data and the third communication data.

16. The computing system of claim 13, wherein the at least one memory further comprises instructions that, when executed by the at least one processor, further cause the computing system to:
determine that third communication data was received for the user account;
determine the second communication data corresponds to high priority communication data; and
determine that the second communication data is to be output prior to at least the third communication data.

17. The computing system of claim 16, wherein the at least one memory further comprises instructions that, when executed by the at least one processor, further cause the computing system to:
determine the second communication data corresponds to high priority communication data using keyword spotting.

18. The computing system of claim 13, wherein the at least one memory further comprises instructions that, when executed by the at least one processor, further cause the computing system to:
determine that third communication data was received for the user account;
determine the second communication data is associated with first sender information;
determine the third communication data is associated with second sender information, the second sender information being different from the first sender information;
determine the second sender information corresponds to prioritized sender information; and
determine that the third communication data is to be output prior to the second communication data and the first communication data.

19. The computing system of claim 13, wherein the at least one memory further comprises instructions that, when executed by the at least one processor, further cause the computing system to:
determine that third communication data was received for the group account;
determine the first communication data is associated with first sender information;
determine the third communication data is associated with second sender information, the second sender information being different from the first sender information;
determine the second sender information corresponds to prioritized sender information; and
determine that the third communication data is to be output prior to the second communication data and the first communication data.

20. The computing system of claim 13, wherein the at least one memory further comprises instructions that, when executed by the at least one processor, further cause the computing system to:
determine that third communication data was received for the user account;
determine fourth communication data was received for the user account;
determine that the fourth communication data was received after the second communication data;
determine the fourth communication data was received after the third communication data;
determine the second communication data was received within a threshold amount of time of the third communication data; and
cause the second communication data and the third communication data to be output prior to the fourth communication data and the first communication data.

\* \* \* \* \*